(12) United States Patent
Axelrod et al.

(10) Patent No.: US 7,347,164 B2
(45) Date of Patent: *Mar. 25, 2008

(54) FOLDABLE/COLLAPSIBLE STRUCTURES

(75) Inventors: Glen Axelrod, Neptune City, NJ (US); Walter Lee, Norman Park (AU)

(73) Assignee: T.F.H. Publications, Inc., Neptune City, NJ (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/387,174

(22) Filed: Mar. 23, 2006

(65) Prior Publication Data

US 2006/0162670 A1     Jul. 27, 2006

Related U.S. Application Data

(63) Continuation of application No. 11/069,429, filed on Mar. 1, 2005, now Pat. No. 7,025,019, which is a continuation of application No. 09/914,047, filed as application No. PCT/US00/04357 on Feb. 22, 2000, which is a continuation-in-part of application No. 09/266,389, filed on Mar. 11, 1999, now abandoned, which is a continuation-in-part of application No. 09/255,117, filed on Feb. 22, 1999, now Pat. No. 5,950,568.

(51) Int. Cl.
    *A01K 1/02*     (2006.01)
(52) U.S. Cl. ..................................... 119/499
(58) Field of Classification Search ................ 119/431, 119/452, 461, 472, 474, 491, 498, 499, 504, 119/513, 514, 528, 165, 168
See application file for complete search history.

(56) References Cited

U.S. PATENT DOCUMENTS 3,048,147 A     8/1962     McKean ...................... 119/19

(Continued)

FOREIGN PATENT DOCUMENTS

DE         298 00 255 U1     4/1998

(Continued)

OTHER PUBLICATIONS

R.C. Steele Wholesale Pet Supply Catalog, Brockport, New York; "Doskocil Kennels", pp. 3 & 18.

(Continued)

*Primary Examiner*—Thomas Price
(74) *Attorney, Agent, or Firm*—Grossman, Tucker, Perreault & Pfleger, PLLC

(57) ABSTRACT

The present invention relates to a collapsible/foldable structure suitable for a variety of applications, such as an animal shelter, pet carrier transportation device, or a collapsible consumer storage container in general, such as a cooler or ice chest. The structure comprises a top roof and a bottom platform defining a top and bottom of said structure and a vertically disposed lower side section on said bottom platform. Front and rear walls are included. The structure also includes a pair of sidewalls each pivotally attached to the roof to facilitate inward collapse of the sidewalls when the sidewalls are pivoted toward the bottom platform. The sidewalls are defined by an upper and middle section including the lower vertically disposed side section, wherein the upper and middle sections are pivotally attached to one another and the middle and lower sections are pivotally attached to one another so that the upper and middle sidewall sections can be pivoted inwardly towards said bottom platform, to provide a compact collapsed condition.

5 Claims, 16 Drawing Sheets

U.S. PATENT DOCUMENTS

| | | | | |
|---|---|---|---|---|
| 3,195,505 A | 7/1965 | Hauth et al. | | 119/17 |
| 3,195,506 A | 7/1965 | Beard | | |
| 3,284,273 A | 11/1966 | Prentice | | 161/83 |
| 3,896,766 A | 7/1975 | Martin | | 119/17 |
| 4,006,713 A | 2/1977 | Hawley, III | | 119/19 |
| 4,091,852 A | 5/1978 | Jordan et al. | | 150/0.5 |
| 4,109,427 A | 8/1978 | O'Brian et al. | | 52/58 R |
| 4,169,428 A | 10/1979 | Waugh | | 119/1 |
| 4,195,593 A | 4/1980 | Dunn | | 119/19 |
| 4,467,572 A | 8/1984 | Somers et al. | | 52/70 |
| 4,484,540 A | 11/1984 | Yamamoto | | 119/19 |
| 4,487,540 A | 12/1984 | Buchheit | | 414/30 |
| 4,520,758 A | 6/1985 | Pfriender | | 119/19 |
| 4,576,116 A | 3/1986 | Binkert | | 119/19 |
| 4,590,885 A | 5/1986 | Sugiura | | 119/19 |
| 4,649,578 A | 3/1987 | Vargo | | 4/449 |
| 4,792,082 A | 12/1988 | Williamson | | 229/103 |
| 4,884,527 A | 12/1989 | Skirvin | | 119/1 |
| 4,903,637 A | 2/1990 | Devault | | 119/19 |
| 5,014,649 A | 5/1991 | Taft | | 119/168 |
| 5,038,721 A | 8/1991 | Ouellette et al. | | 119/167 |
| 5,050,766 A | 9/1991 | Groh | | 220/412 |
| 5,078,096 A | 1/1992 | Bishop et al. | | 119/19 |
| 5,121,710 A | 6/1992 | Gonzalez | | 119/19 |
| 5,133,294 A | 7/1992 | Reid | | 119/96 |
| 5,184,574 A | 2/1993 | Kirk et al. | | 119/162 |
| 5,335,618 A | 8/1994 | Zarola | | 119/19 |
| 5,452,681 A | 9/1995 | Ho | | 119/17 |
| 5,465,686 A | 11/1995 | Monetti et al. | | 119/168 |
| 5,503,107 A | 4/1996 | Satcher et al. | | 119/19 |
| 5,522,344 A | 6/1996 | Demurjian | | 119/474 |
| 5,549,073 A | 8/1996 | Askins et al. | | 119/474 |
| 5,562,228 A | 10/1996 | Ericson | | 220/415 |
| 5,564,454 A | 10/1996 | Curley et al. | | 135/126 |
| 5,622,276 A | 4/1997 | Simmons | | 220/6 |
| 5,626,098 A | 5/1997 | Askins et al. | | 119/474 |
| 5,669,331 A | 9/1997 | Richmond | | 119/497 |
| 5,671,698 A | 9/1997 | Farrugia | | 119/497 |
| 5,715,772 A | 2/1998 | Kamrath et al. | | 119/169 |
| 5,727,502 A | 3/1998 | Askins et al. | | 119/499 |
| 5,752,470 A | 5/1998 | Koneke | | 119/499 |
| 5,769,028 A | 6/1998 | Deckys | | 119/496 |
| 5,803,018 A | 9/1998 | Liou | | 119/461 |
| 5,839,392 A | 11/1998 | Pemberton et al. | | 119/498 |
| 5,950,568 A | 9/1999 | Axelrod et al. | | 119/499 |
| 5,967,090 A | 10/1999 | Hui | | |
| 6,216,638 B1 | 4/2001 | Pivonka et al. | | |
| 6,408,797 B2 | 6/2002 | Pivonka et al. | | |

FOREIGN PATENT DOCUMENTS

| | | | |
|---|---|---|---|
| EP | 0366626 | 5/1990 | |
| EP | 0742999 | 11/1996 | |
| FR | 2731317 | 9/1996 | |
| GB | 1 427 201 | 3/1976 | 119/480 |
| WO | WO 97/47185 | 12/1997 | |

OTHER PUBLICATIONS

European Search Report for the corresponding European Patent Application No. 00910260.9 (3 pgs).

Four Paws K-9 Keeper Dog Crate; print-out of "Directions for Assembling the Deluxe Series"; Four Paw Products Ltd., Hauppauge, NY 11788 (1 pg).

Petmate Collapsible Kennel; flyer of "Assembly Instructions" Petmate, P.O. Box 1246, Arlington, TX 76004-1246 (2 pgs).

Letter dated Feb. 9, 2001 sent to Glenn W. Novotny, President and Chief Operating Officer, Central Garden & Pet Company, Lafayette, California; from Ramon L. Pizarro, Patent Attorney and Counselor at Law of Denver, Colorado representing Scott Pivonka and John Tottleben; their invention entitled "Collapsible Pet Carrier" (1 pg).

Civil Action No. 02-M-2394(MJW) filed in the US District Court, Districk of Colorado on Dec. 23, 2002; Plaintiffs: *Scott Pivonka and John Tottleben*, individually v. *Defendants Central Garden & Pet Company*, Nylabone Corporation and TFC Publications, Inc. (10 pgs).

Office Action dated Mar. 15, 2007 issued in the counterpart Canadian Patent Application No. 2,365,055 filed Feb. 22, 2000 (5 pgs.).

FOLDABLE/COLLAPSIBLE STRUCTURES

CROSS-REFERENCE TO RELATED APPLICATIONS

This application is a continuation of U.S. patent application Ser. No. 11/069,429 filed on Mar. 1, 2005, (now U.S. Pat. No. 7,025,019) which is a continuation of U.S. patent application Ser. No. 09/914,047 filed Jan. 9, 2002, which is a National Stage (371) of PCT/US00/04357 filed Feb. 22, 2000, which claims priority to U.S. patent application Ser. No. 09/334,529 filed Jun. 16, 1999 (now U.S. Pat. No. 6,131,534), which is a continuation-in-part of U.S. patent application Ser. No. 09/266,389 filed Mar. 11, 1999 (now abandoned), and U.S. patent application Ser. No. 09/255,117 filed Feb. 22, 1999 (now U.S. Pat. No. 5,950,568), the teachings of which are incorporated herein by reference.

FIELD OF THE INVENTION

The present invention relates to foldable/collapsible structures, and more particularly to a lightweight animal shelter having excellent thermal insulating features and ease of assembly/disassembly. The shelter can therefore be readily converted into a compact condition for ease of storage and/or transport, and also presents itself as an attractive or classic looking doghouse design when fully deployed. This invention also relates to a pet carrier transportation device and in particular to a collapsible/foldable pet carrier or portable structure that absorbs or isolates liquid waste that may be present in the carrier and which carrier design further provides a more sanitary condition for the pet when in transport. Furthermore, the present invention also relates to storage containers, including such containers as a cooler, or ice chest, which has generally rigid walls, yet can be collapsed or folded into a configuration which takes up much less space, and can therefore be easily stored and/or transported. Finally, the invention herein also relates to a collapsible structure in general, e.g., a collapsible consumer waster container.

BACKGROUND OF THE INVENTION

A fair amount of disclosures have been put forward in recent years, seeking to develop a foldable/collapsible structure primarily for use as an animal shelter. More specifically, a number of pet houses and enclosures have been proposed with the purpose of providing a sleeping area for a pet and for confining a pet, when necessary, for example, when traveling. However, these structures have all tended to be bulky, of relatively high weight, difficult to move from one location to another, and more importantly, not sufficiently foldable/collapsible for ease of storage and transport. Such prior art designs also have not considered the development of a structure that provides appropriate thermal insulation, to thereby provide the pet with comfortable shelter. In short, to date, existing dog houses have been: 1. difficult to construct; 2. take up valuable space in distribution and at retail outlets; 3. are difficult to transport for both the distributor and retailer; 4. are difficult for consumers to transport home or to different locations; and 5. are difficult for consumers to store when not in use.

For example, one early attempt at producing a collapsible animal cage is reported in U.S. Pat. No. 3,896,766, which discloses a collapsible animal cage formed of rectilinear welded wire fabric. The cage is said to have a front and rear rectangular end wall structure movable between an erected position and a folded position overlying a litter tray on the bottom of the cage, side wall structures intermediately hinged between their tops and bottoms and foldable over the end wall structures, and a top hingedly secured to the top of the side walls therein.

U.S. Pat. No. 4,903,637 discloses what is termed a "container" to house or carry small household pets, that may be quickly and manually formed between an erected use mode and a flat folded storage mode. The container is of a gable roofed house configuration in its erected mode and comprises an interconnected structure formed by hingeably related rigid planar elements that occupy a relatively small volume in the folded storage mode. Handles carried by the roof provide aid in manual carriage, and releasable fasteners maintain either an erected or storage mode, and en end wall provides a selectively latchable door.

U.S. Pat. No. 4,576,116 discloses a collapsible A-frame house providing a common site for a cat to rest, exercise and play comprised of a roof of carpet-like material including two integral roof panels with their bottom edges connected to opposing edges of a floor panel also of a carpet-like material. Stiffening panels are affixed onto the backside of the roof panels. A cord with two ends slidably passes through the peak into the house, with cat amusement objects connected to each end. The cord additionally provides a manual handle for lifting the house. Collapsing the house for storage or transport, the house is initially lifted by the cord adjacent the peak. The flexible nature of the floor panels permits an outward folding or buckling of the floor along its longitudinal centerline to thereby completely collapse the house into a folded condition.

U.S. Pat. No. 4,520,758 discloses an animal house which is particularly adaptable for use with cats. The house is formed of an elongated base adapted to stand substantially vertical and a platform at the upper end of the house to form an animal perch. The base is formed of a single piece of self-supporting material with appropriate fold lines being provided by either areas of weakening or by rigid material at the location of the fold lines or by appropriate hinges to permit folding. The base can be formed of three separate panels folded into a three-sided figure of triangular cross section.

U.S. Pat. No. 5,078,096 discloses a curvilinear, four-sided pyramidal container for housing and carriage of small household pets. The container provides a flexible fabric cover which defines optionally coverable mesh windows and an optionally coverable openable access door structure. The container carries a rigid bottom insert and is supported by a rod frame having a square, releasably interconnected bottom element formed of four interconnected semi-rigid rods and two arched, resiliently deformable support rods extending upwardly between opposed corners of the structure, all said rods carried in loops defined on the inner surface of the cover. The support rods are selectively removable to allow assembly and collapse of the structure for storage.

U.S. Pat. No. 5,121,710 discloses a collapsible doghouse to be used indoors or outdoors, to provide a comfortable and easy to clean place for a dog to rest or seek shade. The doghouse includes elongated side walls, a pair of distal walls, one of which includes an arched entranceway and another of which includes a cutout drainage slot, a roof portion, and a weightable base portion, all of which are securely, yet easily removably connected, and are formed of a substantially solid, yet flexible, water repellent plastic which will facilitate easy cleaning and drainage, and lightweight transportation.

U.S. Pat. No. 5,335,618 discloses a collapsible animal enclosure comprising a house unit with spaced side walls and a roof of pliable material, and opposite ends forming an enclosed area for housing an animal. Support bows extend transversely across the sidewalls and roof for holding the sidewalls and roof in an open, spread apart condition. The house unit can be collapsed between a fully erect condition and a collapsed condition in which the ends are pushed inwardly towards one another, collapsing a pliable material between the ends in an accordion-folded manner. U.S. Pat. No. 5,425,681 discloses an animal house, including a cap, a base, four posts and four walls secured together. Both the cap and base include a groove formed in the inner peripheral portion, and the posts each include two slots for engaging with the edges of the walls so as to solidly secure the walls in place. The animal house may be folded into a compact configuration.

U.S. Pat. No. 5,465,686 discloses a disposable, collapsible pet house foldable from a unitary blank of material received in a flat state, the house being foldable from the blank between a collapsed state for shipping, storage and disposal and an enclosed, erect state for use.

U.S. Pat. No. 5,564,454 discloses a collapsible structure having front and back ends with front and back support members including a single central support member to pass in direct line along the cover means and thus support the entire structure at roughly the center of the cover means. The item may be sewn and easily manufactured in a fashion so that upon being collapsed it occupies the smallest possible volume and has no overlapping support members.

U.S. Pat. No. 5,626,098 discloses a collapsible cage for dogs or rabbits comprising a rectangular base, fold-down end walls and folding side walls and a roof. The walls and roof are made of metal grids. The end walls fold down onto the base one over the other. The sidewalls fold in the middle and are hinged at the top to opposite edges of the roof allowing the sidewalls and roof to collapse onto the base over the end walls. The base has a pull out tray and a pan and an access door is provided in one of the end walls. Releasable clips are provided to hold the walls and roof together in an elevated position of the structure.

U.S. Pat. No. 5,727,502 discloses a collapsible pet home having a base, side walls, end walls and a roof which can be converted into an exercise pen for the pet by folding the end walls down onto the base, setting the base on end, and using the base, side walls and roof to form peripheral walls of the exercise pen. The entire structure is said to fold down into a compact package.

U.S. Pat. No. 5,669,331 discloses a pet housing expandable to hold a pet and collapsible to suitcase size for manual transport including a pair of platforms and first and second pairs of spaced walls. The walls are pivotally attached at opposite ends of the platform and are hinged at intermediate positions for collapse and expansion.

U.S. Pat. No. 5,752,470 discloses a collapsible system which can be used for portable pet houses, as well as for emergency housing in ties of disaster. When using this system, the structure will collapse by pushing in the sides from the middle, and by letting the front and back fold onto each other.

U.S. Pat. No. 5,769,028 discloses a pet carrier including a main and insert unit. The main unit defines a carrying space having a closed bottom and four sides, one of which has an opening therethrough large enough to permit an animal to enter the space through the opening. The insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier.

U.S. Pat. No. 4,006,713 discloses a collapsible dog house with two opposite side walls, a front wall, a rear wall, a roof and a floor which are separable components, preferably made of marine plywood. The floor and roof are provided with rectangular skirts. The sidewalls are notched and grooved to interfit with the skirts and front and rear walls. Interlocking means are provided on the two skirts so that when the skirts are in confronting abutment they define the perimeter of a case whose sides are the roof and floor of the dog house.

U.S. Pat. No. 4,109,427 discloses a foldable structure considered to be primarily useful as a doghouse. The structure is foldable between an expanded configuration in which parallel sidewalls are connected by a top, a bottom and parallel ends and a folded configuration in which the side walls are adjacent to one another. In order to achieve a folding action, the top, bottom and the ends each consists of a set of two parts. The parts of each of these sets extend beyond the sidewalls. A first group of hinges are used to pivotally connect the parts of each of the sets to the sidewalls. The second group of hinges are employed to connect the parts of each set midway between the sidewalls.

U.S. Pat. No. 4,195,593 discloses a portable pet-house which defines an A-frame, the roof panel of which are pivoted at the top such that they are collapsible into a generally planar, carrying mode, preferably being floor and end wall members carried internally between the roof panels when the unit is in its portable mode.

U.S. Pat. No. 4,467,572 discloses a collapsible dwelling for animals, including a plurality of elements hingedly joined with each other which when in assembled relationship, cooperatively define an enclosure suitable for pets. All elements are hinged strategically since the elements can be partially disassembled and he aggregate parts stacked one upon the other, for inclusion within a container having a length and width no greater than that of the largest elements.

U.S. Pat. No. 4,169,428 discloses a sleeping bag for pets formed from a multiple ply padded sheet of deeply quilted material which is normally folded along its central portion with opposite halves in overlying relationship to form lower and upper layers and with the edge portions of each half in alignment with each other.

PCT Application No. WO 97/47185 discloses a house for feeding small animals, especially dogs or cats made of a folded section of cardboard or other foldable material with an essentially square lower section forming a bottom and side walls and a roof shaped upper section, where the lower section has an access aperture for the animal. The lower and upper sections are made in one piece from a folded section, where the upper section can be fitted on and secure the lower section where there is t least one removable inlay of corrugated cardboard or another absorbent material covering the bottom.

European Patent 0742 999B1 discloses an animal shelter, comprising a box having at least one strip curtain made of elastic material in front of an entrance to the box interior, characterized in that the strips are fastened in a releasable and in particular too-free, exchangeable manner in a clamp mounting which is fastened to the box.

Finally, as it relates to background art concerning foldable/collapsible structures, European Patent Application 0 3667 626 A1 discloses a portable folding shelter for domestic animals. The shelter comprises a pair of sidewalls articulated at the top edges thereof to a respective sloping element in turn articulated to a central element, a rear and a front apertured wall articulated to the side edges of the sidewalls and each foldable along a middle vertical line, the roof of the shelter being provided with a withdrawing holding handle.

Turning to a background consideration relating to pet carriers, it is noted that a variety of pet carriers have been also been reported in the prior art, all aimed in one form or another to facilitate pet transportation. Specifically, pet carriers are commonly used by pet owners for carrying their pets on trips or as a means for containing the pets when the pets are shipped from one point to another. Pet carriers also commonly double as sleeping quarters for the pet as the owner may contain the pet overnight to prevent the pet from wandering and potentially damaging the home or hotel room in which the owner is occupying.

There are, however, some shortcomings inherent to common pet carriers. During transport, the pet will require food and water and periodically will need to relieve its bodily functions. In addition, the food and water itself, which are placed in the pet carrier, may be overturned by the pet or by carrier movement during transportation. Accordingly, in either case, the pet carriers to date have been inadequate in their ability to efficiently deal with such problems and to provide the pet with a stable hygienic environment.

For example, some common pet carriers currently available have been advertised in the "R.C. Steele Wholesale Pet Supply Catalog", Brockport, N.Y., which illustrates "Doskocil Kennels" as a lightweight, portable kennel designed for safe transportation. Also shown is the "Vari-Kennel" design that contains what is described as a "dial latch system" for ease of assembly. However, neither of these designs display any aspect of how to preserve a sanitary condition in the specific carrier should the animal be forced to relieve itself.

More specifically, reviewing the patent literature as it applies to pet carriers begins with U.S. Pat. No. 5,769,028, entitled "Pet Carrier" which discloses a carrier including a main unit and an insert unit. The main unit defines a carrying space having a closed bottom and four sides, one of which has an opening therethrough large enough to permit an animal to enter the space through the opening, and the insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier.

U.S. Pat. No. 5,503,107 entitled "Pet Carrier" discloses a container for manually transporting a pet having a litter box, food container and water container therein and sliding doors accessible from the exterior of the container for selectively closing the litter box, food container and water container to prevent inadvertent spillage. The container may also include a single compartment or two detachably connected compartments in order that a liter box compartment may be selectively separated from a food and water compartment. Detachable handles are provided in order that each separate compartment of the dual compartment embodiment may be carried separately or as a unified compartment.

U.S. Pat. No. 5,839,392, entitled "Pet Carrier" discloses a corrugated plastic pet carrier with two side panels. A side panel fold line extends between the base panel and each side panel. In addition, a diagonal fold line is said to extend from each corner of the base panel to a first median fold line for collapsing the base panel, side panels and end panels inwardly for collapsing the container from an erect position to a collapsed, generally flat position, and back to an erect position.

U.S. Pat. No. 5,671,698 entitled "Pet Carrier" discloses a pet housing having a rigid bottom panel enclosed in a bottom cover which is attached to a plastic mesh which is shaped to form the pet carrier sides and top. The plastic mesh is attached to inverted U shaped rigid frame members which hold the shape of the sides and top as well as provide structural support to protect the pet being transported. The pet carrier has a rear end panel and door of plastic mesh to complete the enclosure. There is a provision for a tray and absorbent pad in the bottom of the pet carrier for hygiene as well as a cover to protect the pet from the environment.

U.S. Pat. No. 5,133,294, entitled "Pet Carrier for Vehicles" discloses a pet carrier for use in a vehicle comprising a platform sized to generally fit on the passenger seat. Front, rear and side panels are pivotally connected to the platform for movement between generally horizontal positions and upright positions wherein they form a pet enclosure upstanding from the platform.

Attention is directed to U.S. Pat. No. 5,715,772 entitled "Pet Carrier Absorbent Pad" which discloses an absorbent pad designed to be used with pet carriers to absorb liquids that may be present. Specifically, the pad is said to contain an absorbent layer having first and second sides, a first single direction moisture conveyor positioned proximate to at least one side of the absorbent layer for allowing moisture to pass toward the absorbent layer and for resisting passage of moisture out of said absorbent layer. A second single direction moisture conveyor is positioned proximate to said second side of said absorbent layer, wherein the first and second direction moisture conveyors are oriented about said absorbent layer so that moisture travels across said moisture conveyors only toward said absorbent layer.

Finally, as it relates to background art concerning pet carriers, attention is also directed to U.S. Pat. No. 4,484,540 entitled, "Collapsible, Portable Domestic Pet Cage", which discloses a collapsible, portable domestic pet cage for carrying with a pet keeper such domestic pets as dogs, cats and the like, wherein bent portions of the cage can be readily constructed using any connection means and fixing means, and when collapsed dimensionally in small form, the whole circumferential walls of the cage is accommodated between vertical walls of a ceiling plate and erected walls of a receptacle plate or dish so as to be made dimensionally in a small size.

Turning next to a background consideration relating to portable storage designs for the purpose of, e.g., providing the consumer a convenient method to store and transport perishable goods, the following summary is provided.

First, U.S. Pat. No. 5,562,228 discloses a collapsible cooler having four side walls hingedly attached to a bottom panel. Each of the four side walls is composed of two trapezoidal subassemblies hingedly connected about a center longitudinal axis, such that the two subassemblies meet along the shorter edge of the trapezoid. The side walls further comprises flexible corner panels. The top of the container comprises a lid which is hingedly attached to the long side of one of the upper side wall subassemblies. This construction allows the container to be collapsed downward by pushing on the top panel. Similarly, the container is expanded by pulling up on a strap which is attached to two opposing upper side wall subassemblies. The cooler further contains sealed modules of "blue ice", which is a heat transfer material composed of water and glycol, or a similar heat transfer material, contained within the panels of the container.

U.S. Pat. No. 5,622,276 discloses a collapsible container/cooler which has four side walls pivotally connected to a bottom panel in such a manner that the four walls can pivot inward to lie flat on one another in a manner parallel to the bottom panel. The container further comprises an insulated liner, which is permanently attached to two opposing walls and detachably connected to the remaining two walls, and an insulated, removable lid. The container is structurally supported by snaps which serve to lock the side walls in position. When these snaps are engaged they constrain the movement of the side-walls, thereby creating a rigid, right rectangular container.

U.S. Pat. No. 4,091,852 discloses an inflatable box composed of six inflatable panels integrally connected so as to form a rectangular box having a top, bottom, first and second end, and first and second side. The joint between each of the panels consists of a defined fold line. Additionally, integral with, and therefore connecting adjacent edges of adjacent end and side panels, is a rectangular web of non-inflatable material such that when the box is assembled, with the sides and ends normal to the bottom panel, the two webs on each end of the bottom panel will fold across the outside of the end panels so as to provide structural support for the assembled box and therein complete the box in a fluid-tight configuration. The insulating character of the assembled box derives from the air-pockets of the inflated panels.

U.S. Pat. No. 5,050,766 discloses a collapsible ice chest made from corrugated paper. The container is constructed from a rectangular sheet that is folded to create a bottom panel and four side walls with gusset panels which fold over onto the sides, such that the container created is free from any leaks. The ice chest is supplied to the consumer with the bottom pre-filled with ice and the majority of the vertical expanse of the side walls folded down parallel to the bottom panel thereby creating a covered ice tray of relatively low profile and small volume. The ice chest is further supplied with a lid that telescopes onto the container, even when folded into the ice tray configuration in the described manner. At time of use, the container is removed from cold storage, and the side walls are folded into a vertical configuration, therein creating a ready to use ice chest. This ice chest is intended to be cheap and largely disposable, however it is disclosed that after being used the container can be emptied and folded back into its initial configuration, thereby greatly reducing its size, and reused simply by re-expanding the side walls in the previously described manner.

Accordingly, upon extensive review of all the prior art noted above, it is first apparent that a completely foldable, collapsible structure, suitable as a shelter for a pet, comprised of lightweight material having excellent thermal insulating features and ease of assembly/disassembly, remains generally unavailable. Therefore, it is a first object to overcome the disadvantages of the various structures noted above, and prepare a foldable, collapsible structure which is more economical to manufacture and purchase, and which can readily be converted into a compact condition for ease of storage and/or transport and also presents itself in an attractive or classic-looking doghouse design when fully deployed. Yet another object of this invention is to provide a foldable/collapsible structure suitable for a pet which simple to set up, take down and convert from one use to another.

Furthermore, with respect to the extensive review of the prior art related to pet carriers, although certain pet carrier designs have been disclosed which are, as noted, collapsible, and although absorbent pads of certain construction are known, there remains an on-going demand for a pet carrier design which more efficiently deals with liquid waste build-up, and which also collapses into a substantially flat configuration for ease of storage/transportation when not in use. Stated another way, pet carriers to date have shown themselves to be relatively bulky and heavy thereby failing to provide a simple, lightweight and portable pet carrier which provides both comfort and good hygiene for the pet, and also provides a safe/sturdy structure for protection during transport.

Accordingly, it is also a general object of this invention to provide a pet carrier that is conveniently collapsible for storage, and which provides both the pet and the pet owner with an advantageous method to deal with liquid animal waste which occurs in the carrier over extended periods of time.

More specifically, it is also an object of this invention to provide a pet carrier design that allows for ease of cleaning of animal waste, and which isolates the animal from the liquid waste when the pet is forced to remain in the carrier after relieving itself.

Furthermore, it is also an object of this invention to provide a more humane method of transporting pets. That is, it is an object of the invention herein to provide a pet carrier construction wherein the pet can be provided with essential liquid nourishment when in transport without fear of the pet becoming exposed to unsanitary and unhealthy conditions due to the evolution of a soiled environment.

Finally, and once again, as can be seen from the above review of the prior art, while various attempts have been made to provide consumer products such as a break-apart cooler, there remains an on-going need to improve upon such designs in order to provide a more durable yet collapsible configuration, that readily converts from a portable cooler mode to storage mode with minimal hand operation.

It is therefore also an additional object of this invention to provide such a new and improved collapsible cooler design which is of the aforementioned durable and reliable construction, and which also provides a waterproof enclosure for ice cooling, and makes use of living type hinge structure along with a strategic placement of hinge points in the cooler walls for collapsibility and ease of transport. In addition, it is also an object of this invention to provide a portable and collapsible structure that would be suitable, for example, to restrict access to consumer waste containers and the like, and which would readily provide the consumer with a convenient, sanitary, and cosmetically pleasing alternative for storing waste containers.

SUMMARY

Figure 1:
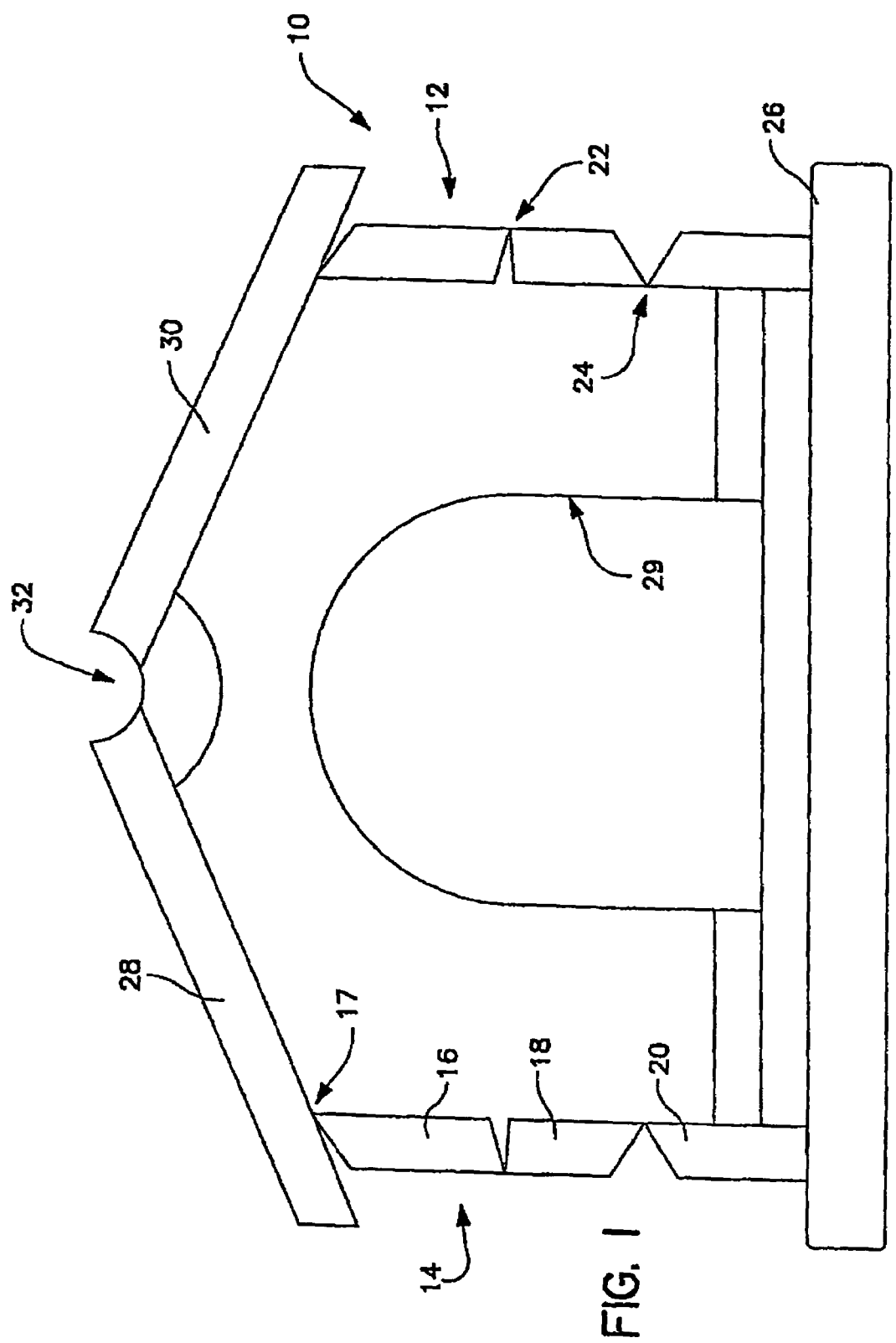
FIG. 1 is a front-end view of the collapsible/foldable structure of the present invention.

In summary form, and in a first embodiment, the invention herein relates to a collapsible/foldable structure comprising a top roof and a bottom platform defining a top and bottom of said structure, and a vertically disposed lower side section on said bottom platform. Front and rear collapsible walls are provided, each pivotally attached to said vertically disposed side section to provide for pivotal collapse of said front and rear walls. The front wall has an opening for egress and ingress of an animal. A pair of sidewalls are included each pivotally attached to said roof to facilitate inward collapse of said sidewalls when said sidewalls are pivoted toward said bottom platform, said sidewalls defined by an upper and middle section including said lower vertically disposed side section, wherein said upper and middle sections are pivotally attached to one another and said middle and lower section are pivotally attached to one another so that said upper and middle sidewall sections can be pivoted inwardly towards said bottom platform. The top roof optionally comprises two roof sections pivotally attached to one another so that said two roof sections can collapse downwardly along said pivotable attachment toward said bottom platform. The sidewalls contain an outer and inner surface thereof, and said upper and middle sidewalls are pivotally attached by a continuous outer surface of said sidewalls.

In yet another summary embodiment, the present invention relates to a collapsible/foldable structure comprising a top roof and a bottom platform defining a top and bottom of said structure and a vertically disposed lower side section on said bottom platform. Front and rear walls are included, said front wall having an opening for egress and ingress of an animal. The structure also includes a pair of sidewalls each pivotally attached to said roof to facilitate inward collapse of said sidewalls when said sidewalls are pivoted toward said bottom platform, said sidewalls defined by an upper and middle section including said lower vertically disposed side section, wherein said upper and middle sections are pivotally attached to one another and said middle and lower sections are pivotally attached to one another so that said upper and middle sidewall sections can be pivoted inwardly towards said bottom platform. At least one of said pivotal attachments of said sidewalls is optionally a living hinge substantially along the length of said sidewall.

In still yet another summary embodiment, the present invention relates a collapsible consumer container such as a foldable/collapsible structure for storing perishable goods comprising a horizontally disposed bottom panel and a vertically disposed side section, a top panel, a pair of side panels defined by upper and middle side sections including said vertically disposed side section, including first and second end panels. The first end panel and second end panel are then hingedly attached to said vertically disposed side section to provide for pivotal collapse of said first and second end panel, and said upper side section is hingedly connected to said top panel and said middle side section, and said middle section is hingedly connected to said vertically disposed side section, wherein said side panels can be pivoted inwardly towards said bottom panel.

DETAILED DESCRIPTION OF THE PREFERRED EMBODIMENTS

Turning next to a more detailed description of the various preferred embodiments of the present invention, as illustrated in FIG. 1, the collapsible/foldable structure of the present invention is shown generally at 10, and comprising sidewalls 12 and 14. Sidewalls 12 and 14 contain an upper 16, middle 18 and lower generally vertically disposed section 20. As can be seen, the sidewalls contain a pivot 22 preferably disposed on the outer surface of the sidewalls 12 and 14, and a pivot 24, preferably disposed on the inside surface of the sidewall, such that when collapsing said sidewalls (see FIG. 2) the upper 16 and middle 18 sidewalls collapse inwardly and towards the bottom platform 26. In addition, upper sidewall 16 is pivotally attached to either roof section 28 and 30 at 17.

As also shown in FIG. 1, the collapsible/foldable structure 10 further contains a front wall 29 which preferably defines the front portal opening. Preferably, and as also shown in FIG. 1, the opening is of a portal/circular configuration of the classic pet-shelter or doghouse design. In addition, structure 10 further contains a top roof section comprising two roof sections pivotally attached to one another at 32, so that roof sections 28 and 30 can collapse downwardly along said pivotable attachment 32 toward said bottom platform 26.

Figure 2:
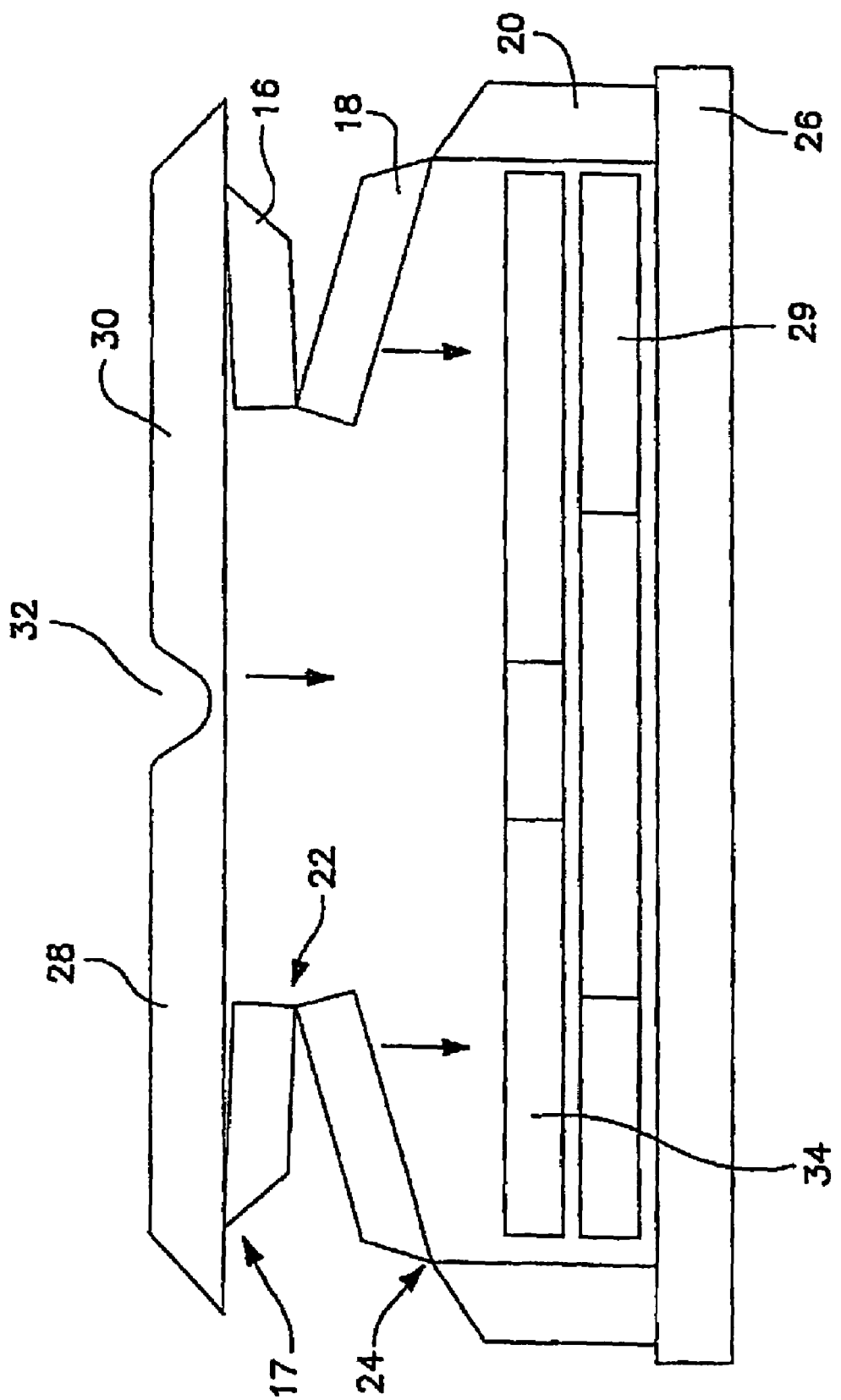
FIG. 2 is a front-end view of the collapsible/foldable structure of the present invention, in a partially collapsed/folded state.

In that regard, attention is directed to FIG. 2, which illustrates the collapsible/foldable structure of the present invention in a partially collapsed state. As illustrated therein, the upper 16 and middle sidewall sections are collapsed and disposed inward in the structure 10 and begin to assume the fully collapsed planar position, best illustrated in FIG. 3. Also, as shown in FIG. 2, preferably, front wall 29, which is pivotally attached to vertically disposed section 20, is also made to collapse inwardly to rest on bottom section 26, and preferably, rear wall 34, which is also pivotably attached to vertically disposed section 20, also collapses inwardly and rests upon front wall 29 when in a fully collapsed state. Those skilled in the art, however, will recognize that it may also be preferable to modify such pivotable attachment to facilitate the resting of front wall 29 on top of rear wall 34, when again, in a collapsed state.

In addition, as shown in FIG. 1, front wall 29 may contain, at a section disposed directly beneath pivot location 32, an opening, preferably of semi-circular configuration, to facilitate ventilation of the structure. Such opening can also be optionally placed in the rear wall 34.

Figure 3:
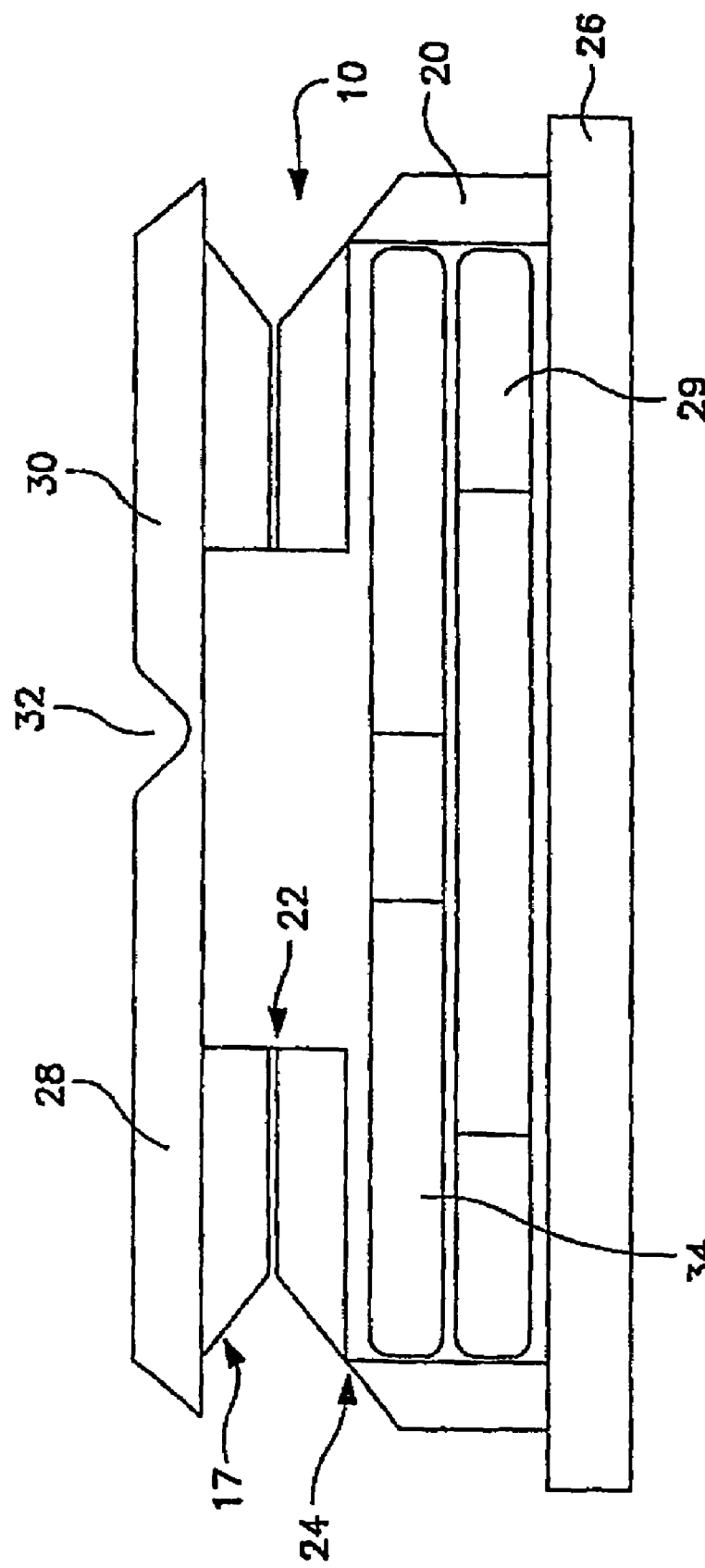
FIG. 3 is a front-end view of the collapsible/foldable structure of the present invention, in a fully collapsed/folded state.

Attention is next directed to FIG. 3, which illustrates the present invention in a fully collapsed condition. As can be seen in FIG. 3, the interaction of pivot points 17, 22, 24, as well as the inward collapse of the front 28 and rear collapsible walls 34 which are pivotally attached to the bottom section 26 provide the unique and previously unavailable ability to collapse the classic pet shelter design illustrated in FIG. 1 into a substantially flat, readily transportable structure.

Figure 4:
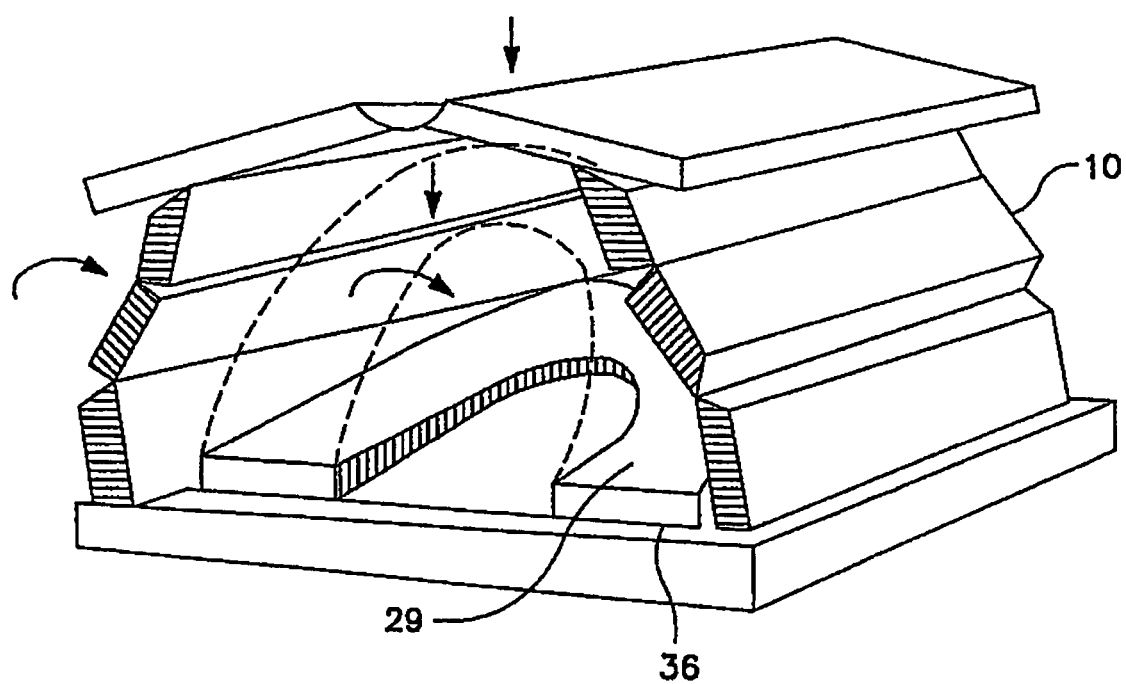
FIG. 4 is a front/side view of the collapsible/foldable structure of the present invention, in a partially collapsed/folded state.

Turning next to FIG. 4, as better illustrated therein, front wall 29 is shown as pivoting inwardly into structure along pivot edge 36. With attention next directed to FIG. 5, structure 10 is shown in cut-away view with respect to bottom section 26. More specifically, bottom section 26 preferably contains a hollow section 41 in which sand or other weight or load material can be incorporated, to strategically add weight to the bottom section to facilitate placement stability. In addition, as also shown in FIG. 5, the structure 10 may optionally contain an attached chimney type feature, which in preferred embodiment, is configured to contain a solar-powered fan so that the animal or pet inside shelter 10 is treated to improved ventilation.

In addition, in preferred embodiment, it can be appreciated that certain exposed surface of shelter 10 may be vulnerable to chewing and destruction by a pet, and therefore, should preferably be protected from such action by the strategic placement of protection material. In that regard, attention is again directed to FIG. 5, wherein exposed and/or overhanging surfaces 38 of the roof section or front entrance are preferably protected with a layer of material that restricts the ability of the animal to chew on such exposed surfaces and destroy the structure. Accordingly, exposed surfaces are preferably further protected with plastic sheeting materials, including, but not limited to polyolefins, vinyl polymers, styrene based polymers, acrylonitrile-butadiene-styrene resins, vinyl polymer resins, engineering thermoplastics, and thermoset type resins or coatings which would all provide the necessary barrier to chewing destruction of an animal.

Figure 5:
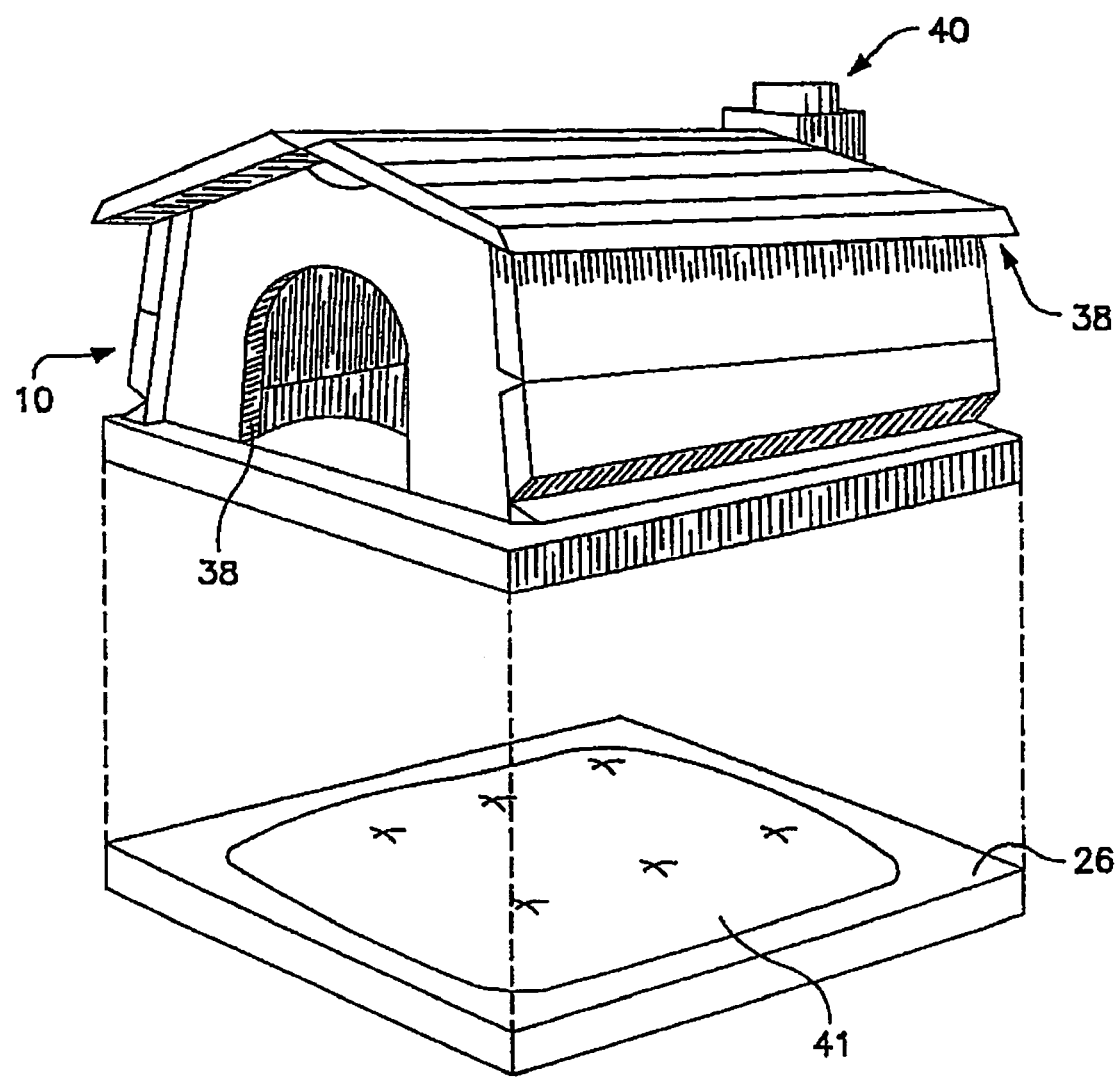
FIG. 5 is an exploded side/front view of the collapsible/foldable structure of the present invention, illustrating an optional clip-on chimney feature with solar-powered fan.

In addition, as also illustrated in FIG. 5, preferably, bottom platform 26 preferably contains a hollow section 41 for the incorporation of a ballast material, such as sand, to improve the weight of structure 10 for purposes of positioning stability. Alternatively, bottom platform can be made from a material that is itself of greater weight relative to the sidewall and/or roof section.

With all of the above in mind, it is herein disclosed that preferably, the materials employed for the structure 10 are first selected from those materials that provide thermal insulation, and accordingly, include expanded type polymer materials, preferably foam materials, optionally containing a film type surface. Along those lines, and again with reference to FIG. 1, roof sections 28 and 30, as well as sidewall sections 16, 18 and 20, front wall section 29, rear wall section 34, and bottom platform 26 are all preferably made from expanded polymeric foam material, such as expanded or foamed polystyrene material, which foam material may contain an film surface of high-impact polystyrene. In addition, other foam materials are suitable, including but not limited to polyurethane type foam materials, polyurea/urethane, polyurea, trimer foam, etc. Accordingly, in broad embodiment, any synthetic foam material that provides thermal insulation and temperature control of the interior of the foldable/collapsible structure will be suitable for construction of the present invention.

Furthermore, the above identified sections of FIG. 1 can also be suitably prepared from non-foamed plastic material, or, for that matter, plastic material which provides a void or null space between sections thereof, which would also similarly provide thermal insulation characteristics. Moreover, the structure of the present invention can be prepared from structural type foam material, which, is preferably made from engineering type plastic resins such as polycarbonate resin. As those skilled in the art are aware, structural foam material, while perhaps not as efficient as expanded or cellular type foam material, still can provide thermal insulation efficiency, while at the same time, structural integrity to the various components (sidewalls, bottom platform, roof section) of the present invention.

In addition, it is also possible to prepare structure 10 out of material made from such techniques as gas-assisted injection molding. Such process, which preferably makes use of gases such as nitrogen, provides an inert gas to the interiors (null space) of the sidewalls 12 and 14, roof sections 28 and 30, front wall 29 and rear wall 34. In addition, said structural components can also be made hollow and optionally contain common thermal insulation media such as fiberglass or cellulose type material.

When foam material is employed in the present invention, it has also been found preferable to include, on the outer layer of the foam (i.e., that surface exposed to weather) a film protective layer that prevents weather damage to the foam layer, and also provides a better or improved cosmetic appearance. That is, those skilled in the art will appreciate that the film layer can be made to assume a wood-like grain appearance, such that the structure 10 takes on the appearance of a wood structure, which is cosmetically pleasing to the consumer. In that regard, a particularly preferred embodiment centers on the use of expanded polystyrene foam for the structure 10, and an outer film layer, also of polystyrene resin. Insulating expanded polystyrene will preferably have a thickness on the order of 1.25 cm or more to provide an insulating layer to keep the occupant of the structure warm in cold weather, and cool in hot weather.

On that note, the outer film material can also conveniently serve as an integral type hinge material. For example, pivots 32, 17, 22 and 24, as shown in FIG. 1, can of course, comprise an add-on standard type hinge construction, and can therefore be of sufficient number (running along the length of the structure) to effectuate the foldable/collapsible mechanism herein described. Alternatively, said pivots can also run the entire length of the structure, and be made of a polyolefin (polypropylene), which therefore provides a living-hinge characteristic to the present invention. Again, the living hinge can be either a non-integral feature of the roof, sidewalls, and bottom section (i.e. an add-on), or, alternatively, can be integral to said structural components as illustrated in the drawings.

Figure 6:
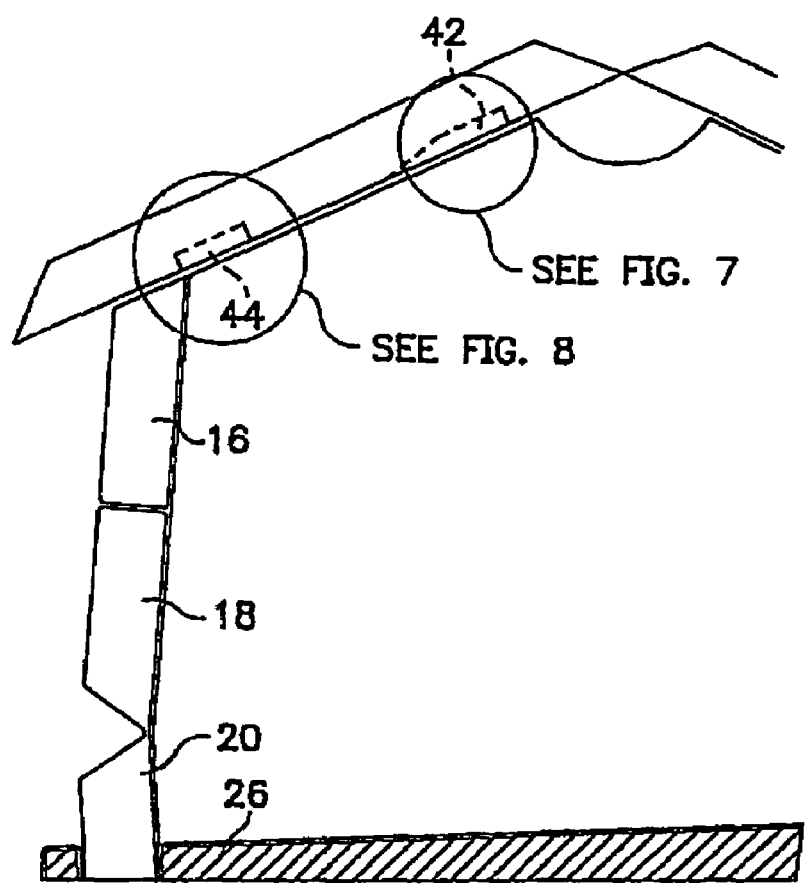
FIG. 6 is an exploded view of the optional assembly recess and location recess for improved stability of the foldable/collapsible structure when in assembled condition.
Figure 7:
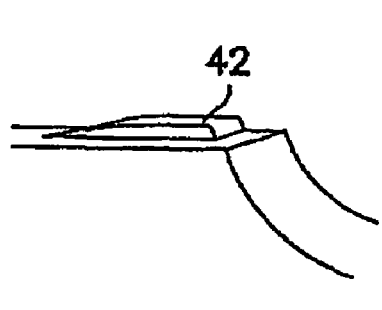
FIGS. 7 and 8 are exploded views of appropriately identified designated sections of FIG. 6.
Figure 8:
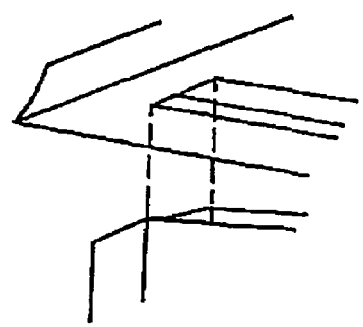

Finally, attention is directed to FIGS. 6-8, which illustrates, among other things, that in preferred embodiment, bottom vertical sidewall section 20 is made to rest within bottom platform 26. In addition, preferably, the front and rear walls are made to contain a location recess 42 and an assembly recess 44. Accordingly, those skilled in the art will appreciate that the location recess 42 and assembly recess 44 will, in optional embodiment, improve and lock roof sections 28 and 30 to said front and rear side wall sections, thereby providing improved, but by no means necessary, structural integrity to the collapsible/foldable structure of the present invention.

While preferred embodiments of the invention provide that the front and rear walls are hingedly attached to the vertical sidewall section 20 so that they can be folded inwardly and beneath the side walls and roof, they can be physically removed from the front and rear openings. When in the open position, the front and rear walls act to further support the sides and roof, and when the front and rear walls are completely removed from the structure they can be either placed on top of the structure, inside or underneath and then optionally be bound up with suitable fastening so that the complete structure can be shipped as one package.

In all of the above structures, it is also noted that the sidewall sections 16, 18 and 20 will hinge on either the inner surface or the outer surface of said sidewalls depending upon whether the hinge is moving outwardly or inwardly during the collapsing motion. That is, placing the hinge on the inner or outer sidewall becomes necessary because of the thickness required for the preferred double wall construction, which, as noted, provides an open region for insulation.

In addition to the above, the upper portion 16 of the sidewall, which is hinged at 22 to the sidewall 18, may be connected to a flat roof section. The central flat section with the two upper sidewalls (which would now be inwardly sloping) would then form the roof of the house. This type of optional configuration is illustrated, in part, in FIG. 18, as applied to the related pet carrier. In this preferred alternative embodiment of this form of the invention, the hinges are positioned on the inner and outer edges of the walls adjacent the inner and outer edges as required for proper collapsing action.

Figure 9:
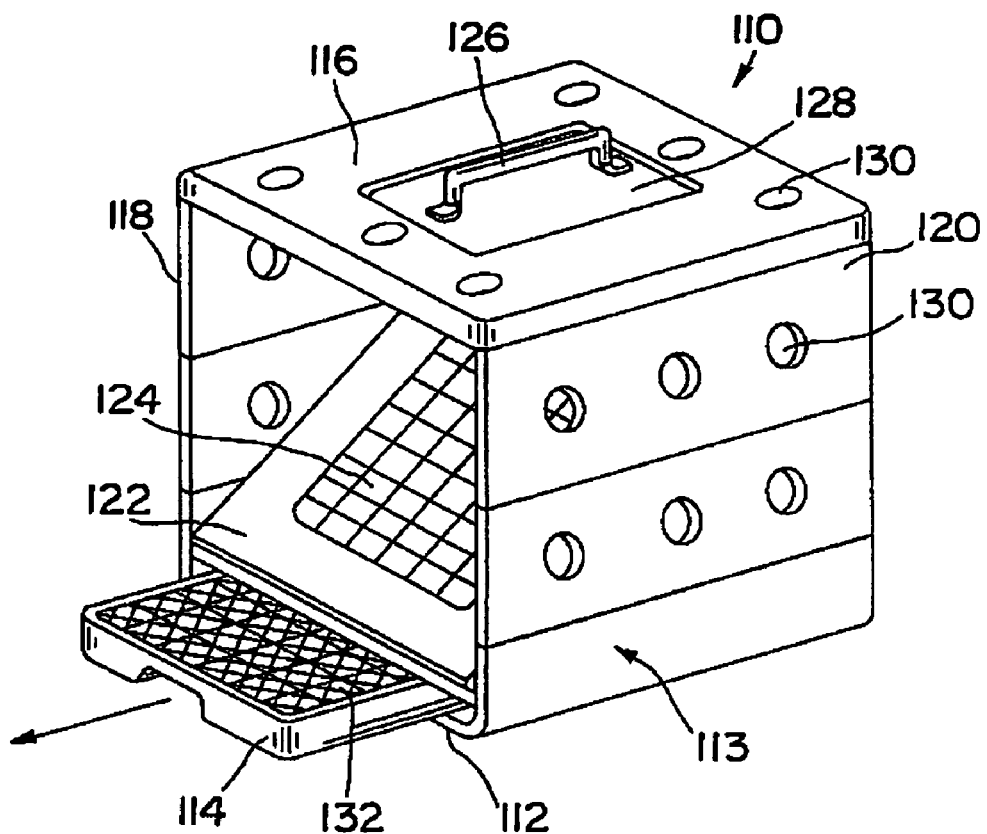
FIG. 9 illustrates a perspective view of one preferred embodiment pet carrier/portable structure design.

A preferred pet carrier/portable structure design in accordance with the present invention is now illustrated in FIG. 9. As shown therein, the pet carrier 110 contains a bottom panel 112 and tray 114 removably placed on the bottom panel, a top panel 116, a left panel 118, a right panel 120 and a first end panel 122 containing a screen door section 124. In addition, the carrier contains a folding handle 126 which rests within recess 128. Also shown about the carrier 110 are air holes 130. As shown in FIG. 9, the first end panel 122 is hingedly attached to vertical side panel 113 so that end panel 122 can be readily made to collapse inwardly into carrier 110. In a similar manner, carrier 110 also preferably contains a second end panel (not shown) at the rear of the carrier that is also hingedly attached to the vertical side panel 113 so that it too can be made to collapse inwardly into the carrier 110 when the carrier 110 is not in use.

Figure 10:
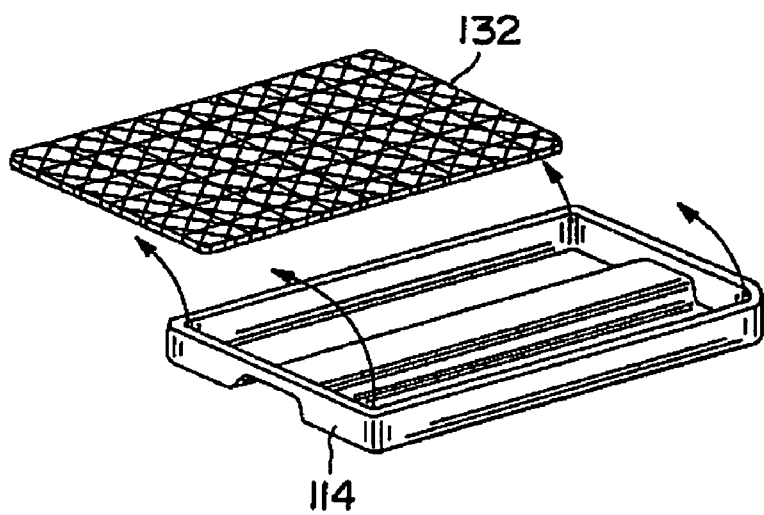
FIG. 10 ILLUSTRATES a perspective view of the pet carrier removable tray.

With attention directed at both FIGS. 9 and 10, the tray 114 is shown to have a screen material 132 which screen material preferably rests on top of the tray 114. The screen material 132 therefore conveniently allows for passage of liquid into the tray but also simultaneously supports the pet above any liquid passing into tray 114, thereby providing an improved sanitary condition for the pet over extended periods of time.

In that regard, screen 132 is preferably constructed from a double layer of screen material. That is, screen 132 preferably contains a top layer of fine mesh/screen material to allow for both fluid passage while preventing a paw or nail of the animal from falling therethrough and becoming dangerously affixed to said mesh/screen material. Accordingly, such upper layer of mesh/screen material is preferably made close enough in opening to be comfortable for the animal to walk upon when the animal is placed within the carrier. This upper layer of fine mesh is then placed upon a lower structural grid screen which is therein designed to support the animal's weight. With respect to this preferred use of a double layer of screen material, it has been found that the top layer is preferably of mesh size or sieve size No. 400 to about 0.25 (nominal opening of 0.0038 cm to 0.635 cm as noted in the "Handbook of Chemistry and Physics CRC, 58$^{th}$ Edition, Standard Test Sieves-Wire Cloth") and can be made from plastic or metallic type screen/mesh material. At such screen/mesh size, and as noted, the mesh will conveniently allow for passage of liquids, which of course include liquids spilled by the animal and/or liquid waste produced by the animal if forced to urinate in the carrier. The lower structural layer can then be readily fabricated from larger and heavier mesh/screen size material, such as, e.g., mesh size of greater than about 0.635 cm to, e.g., 12.7 cm, which corresponds to a nominal opening of 0.635 cm to about 12.7 cm. The lower structural layer has as its purpose to support the load of the animal, while again, allowing for fluid passage.

Alternatively, those skilled in the art will appreciate that screen 132 can be made of a simple monolayer type screen/mesh construction, which monolayer similarly achieves the goal of allowing for fluid passage and acts to prevent a paw or nail from falling through and becoming lodged therein, which could cause injury to the animal. However, if monolayer construction is the choice, the monolayer itself must be made sufficiently strong/rigid to support the animal's weight contained therein. In that regard, it has been found suitable to use a monolayer type screen/mesh material of a mesh size for positioning on tray 114 so that tray 114 acts to collect liquid or liquid waste and simultaneously supports the animal above such captured liquids. In that regard, the mesh size can again be preferably made in the range of mesh size No. 400 to 0.25. However, this is only a preferred range, and as noted above, the selection of mesh size is done to accommodate passage of fluids and to prevent injury to the animal by preventing the animal's paw or nail from becoming trapped.

Figure 11:
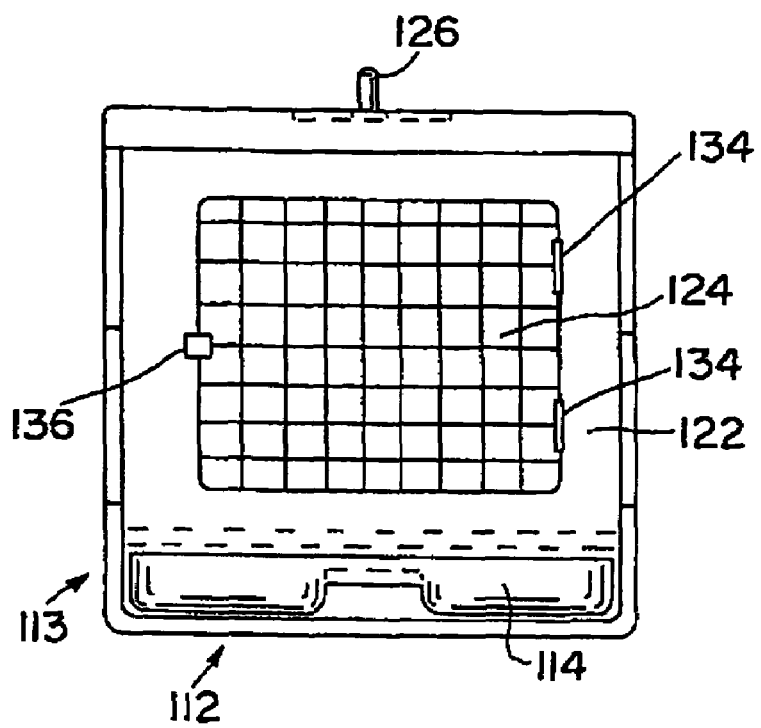
FIG. 11 illustrates a front perspective view of a preferred pet carrier design.

FIG. 11 shows a front perspective view of the carrier 110. As illustrated therein, the screen door section 124 is preferably hinged at 134 to the end panel 122 and also preferably contains a latch 136. As also shown in FIG. 11, the tray 114 rests in the bottom panel 112, and the folding handle is again shown at 126.

Figure 12:
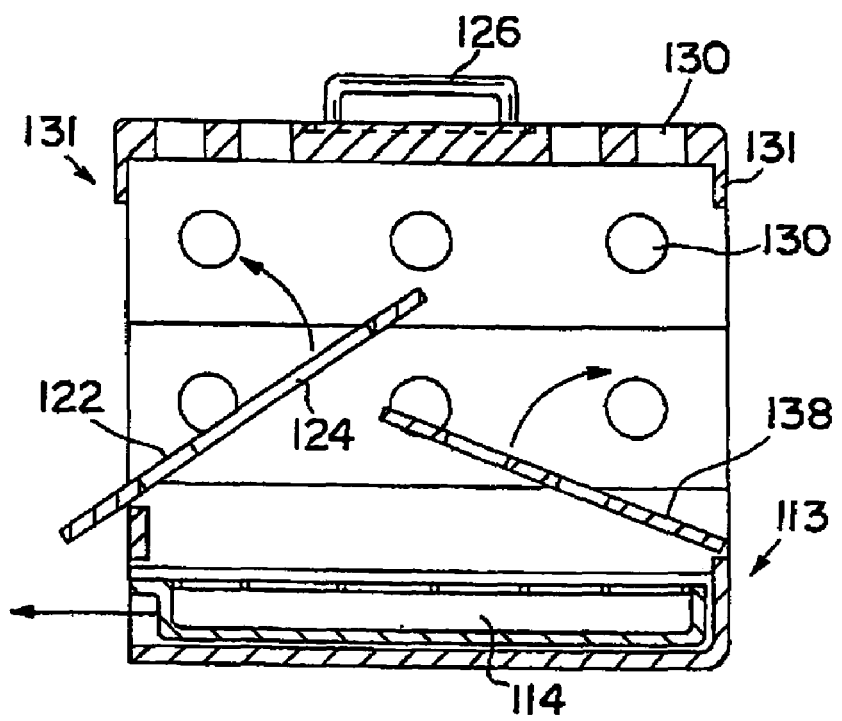
FIG. 12 illustrates a side perspective view of a preferred pet carrier design in partially collapsed configuration.

Attention is next directed to FIG. 12, which provides a side perspective view of a preferred pet carrier design in partially collapsed configuration. As seen therein, first end panel 122 containing screen door 124 is hingedly collapsed inwardly into the pet carrier. Similarly, second end panel 138 is hingedly collapsed into the pet carrier, which collapsing first end panel 122 and second end panel 138 initiates the folding of the carrier into a substantially flat construction for ease of storage. Also, as shown in this particular preferred embodiment, end panel 138 is hingedly connected to vertical side panel 113.

However, while FIG. 12 illustrates the preferred configuration herein where the first end panel 122 and second end panel 138 are hingedly connected to the vertical side panel 113, it will be appreciated that end panels 122 and 138 can simply be made so that they are releasably engaged to the pet carrier, e.g., by a mechanical attachment such as a snap-fit or wing-nuts with quick release. In that manner the end panels can be easily released/removed from the pet carrier and/or placed within the pet carrier for the purposes of shipping/storage. Furthermore, although not specifically iIllustrated, it is worth noting that either of the end panels 122 or 138 are preferably made with a non-frictional type locking mechanism which locks the front and rear walls as between themselves as the roof section.

Figure 13:
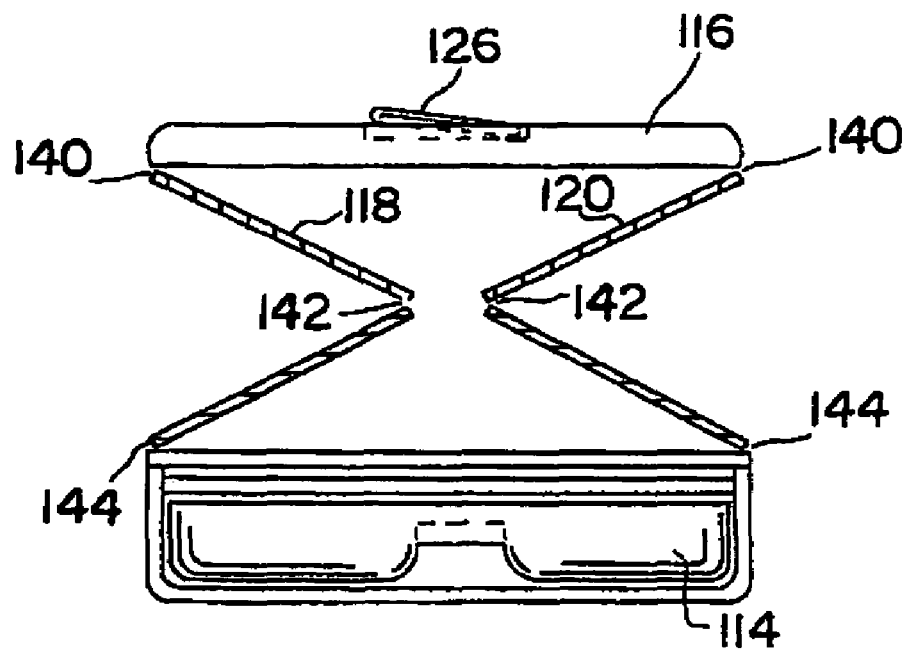
FIG. 13 illustrates a front perspective view of a preferred pet carrier design in partially collapsed configuration.
Figure 14:
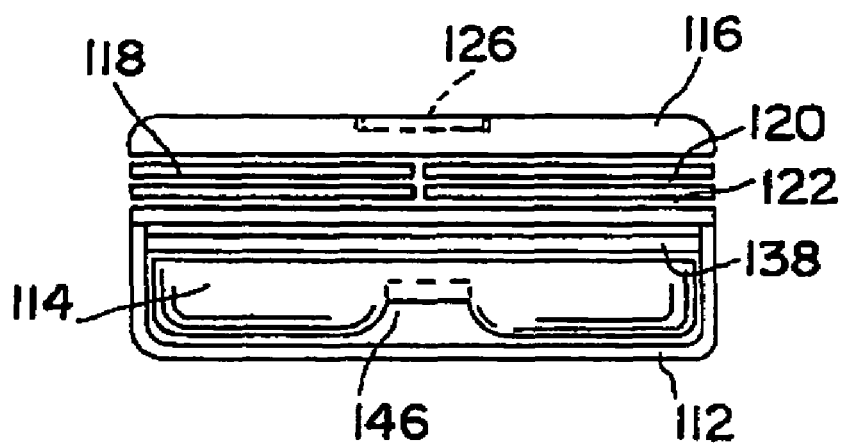
FIG. 14 illustrates a front perspective view of the preferred pet carrier design in a fully collapsed configuration.

FIG. 13 illustrates a front perspective view of a preferred pet carrier design in partially collapsed configuration. As shown therein, the panels 118 or 120 are both hingedly connected at 140 to top panel 116. In addition, a hinged connection is shown at 142 and a further hinge connection is placed at 144, which connection 144 connects the panels 118 and 120 to the bottom section 144. As shown in FIG. 13, such strategic placement of hinges 140, 142 and 144 allows for the panels 118 and 120 to collapse downwardly into a substantially flat collapsed configuration, as shown in FIG. 14. That is, with attention to FIG. 14, handle 126 is made to rest in a recess in the top panel 116, panels 118 and 120 are in a fully collapsed state, as well as panels 122 and 138. In this collapsed state, it can be seen that tray 114 still conveniently rests within bottom panel 114. Accordingly, it can be appreciated that in the collapsed state shown in FIG. 14, the pet carrier design herein can be conveniently stored or transported for further use.

Finally, with attention again directed at FIG. 13, as illustrated therein, hinge connections 140, 142 and 144 are arranged such that panels 118 and 120 collapse inwardly into the carrier. That being the case, the hinge 140 is preferably hinged so that the hinge itself is positioned on the inside surface of panels 118 and 120; i.e., the hinge is inside the carrier as shown in FIG. 13. Hinge connection 142, as also shown in FIG. 13, is itself positioned on the outside surface of panels 118 and 120, and finally, hinge 144 is preferably designed so that the hinge is connected to the inside surface of panels 118 and 120. Such positioning of the hinge connections 140, 142 and 144 thereby facilitate the collapse of the panels 118 and 120, downwardly, into the substantially flat configuration shown in FIG. 14.

Accordingly, in optional embodiment, the left panel 118 and right panel 120 as disclosed herein can be made to contain an upper, middle and lower sections, wherein said upper and middle sections are pivotally or hingedly attached to one another and said middle and lower section are also pivotally or hingedly attached to one another so that said upper and middle panel sections can be pivoted or hinged inwardly towards said bottom panel 112.

On that note, hinges 140, 142, and 144, as shown in FIG. 13, may comprise an add-on standard mechanical type plastic or metallic hinge construction, and can therefore be of sufficient number (running along the length of the structure) to effectuate the foldable/collapsible mechanism herein described. Alternatively, said hinges can also run the entire length of the structure, and be made of a polyolefin (polypropylene), which therefore provides living-hinge characteristics to the present invention. The living hinge can be either a non-integral feature of the panels (i.e. an add-on), or, in alternative embodiment, can be made integral to said panels, in which case the hinge would be contiguous with the outer surface of the panels 118 and 120.

Optionally, tray 114 can be made to contain an absorbent pad, for purposes of soaking up any liquid spilled by the animal, or liquid waste should the animal be forced to relieve itself when contained within the carrier. In addition, as illustrated in FIG. 14, the tray 112 also preferably contains a recess at 146 which conveniently provides a location for the consumer to hold onto the tray and remove the tray from the carrier for any necessary cleaning.

With regards to the preferred materials of construction, it is to be noted herein that the pet carrier panels are themselves preferably manufactured of panels made of a plastic outer layer with a polyurethane foam core. Such construction provides excellent thermal insulation, as well as lightweight and durability for ease of transport. The plastic outer layer, as previously noted above, can then be preferably made from a polyethylene or polypropylene resin, to thereby provide a flexible film outer layer for the purposes of forming the above noted hinge sections 140, 142 and 144. In that regard, a polypropylene film would provide the aforementioned living hinge structure while being integral to the outer plastic layer of the carrier panels.

Figure 15:
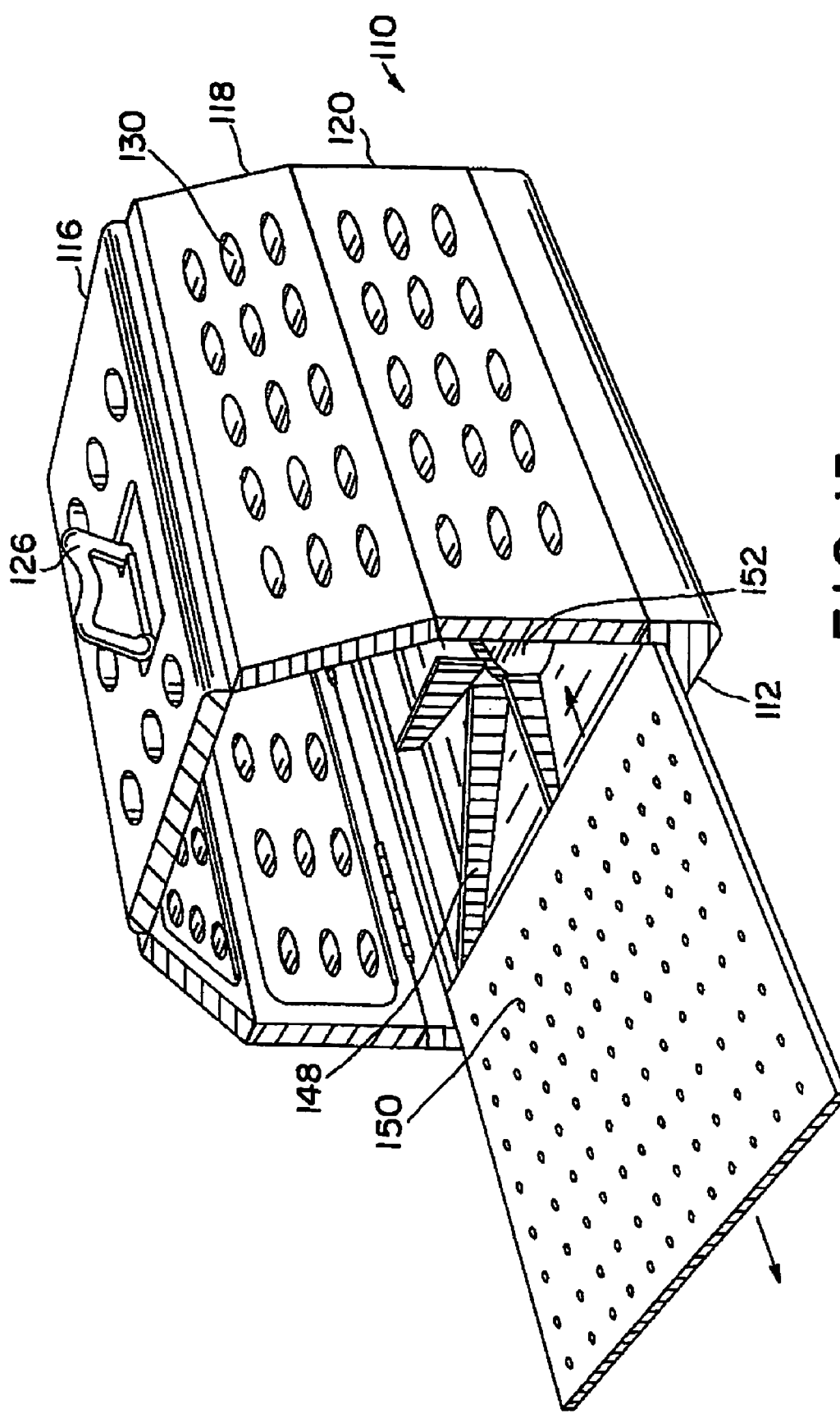
FIG. 15 illustrates yet another preferred embodiment of the present invention is which a perforated removable tray is supported by ribbed supports on the bottom of the pet carrier/portable habitat.

With regard to yet another preferred embodiment of the present invention, attention is directed to FIG. 15, which again illustrates the pet carrier/portable habitat 110 which bottom panel therein 112 contains support structures 148 attached thereto. In addition, a perforated removable tray 150, made of plastic, is shown and which is configured to rest upon support structures 148 at the bottom of the habitat 110. Optionally, the support structures can be part of the tray 150. In addition, the support structures 148 can be either integral with the bottom section, or a separate lift-out component.

Figure 16:
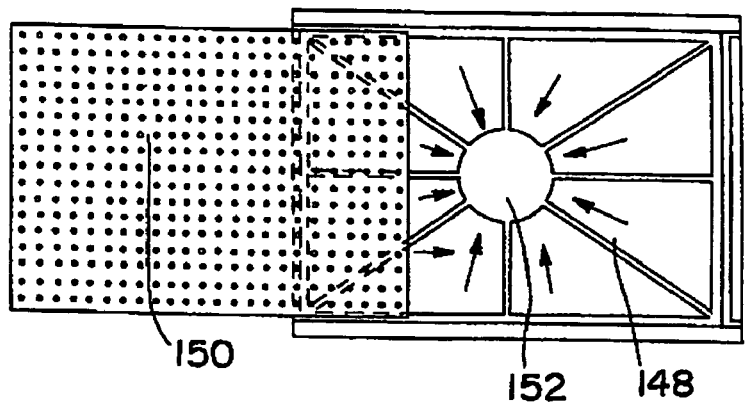
FIG. 16 provides a plan view of the pet carrier/portable habitat of FIG. 15.

As specifically shown, support structures 148 are preferably a ribbed design, of which a plurality preferably extend, as shown in FIG. 16, from the edge of the bottom section into the carrier and extend towards a circular recessed area 152 in the bottom section 112. The circular recessed area 152 thereby acts as a built-in collection location for any liquid waste produced by the animal. Accordingly, within the circular recessed area 152 it will be preferable at times to include an absorbent collection pad.

It is also to be noted that the various structural sections of the present invention, such as bottom section 112, as well as panels 116, 118 and 120, are preferably manufactured by a process of blow molding, which provides both an inner and outer wall structure (twin-wall construction) to the portable habitat herein. Such twin wall construction is best shown at 154 in FIG. 17, which illustrates a front sectional view of the portable habitat. In that regard, such blow molded wall construction provides a much safer environment for the pet, as any impact against the outer wall will be better absorbed in such blow molded wall construction as opposed to a single type wall configuration. In addition, such inner and outer wall construction conveniently allows for the optional use of insulating foam material, which would provide better regulation and temperature control inside the portable habitat when in transit, or exposed to severe temperature fluctuations.

However, in the broad context of the present invention, single wall construction is certainly acceptable, and indeed preferable in those cases where a lower cost alternative design is contemplated. Furthermore, regardless of whether single wall or twin-wall construction is present, it is also preferable herein to include, on the edges of the panels 116, 118 and 120 a small overhanging section. This is best illustrated at 131 in FIG. 12, which then serves to position and secure the end panels 122 and 138 as they are moved into full open position.

Figure 17:
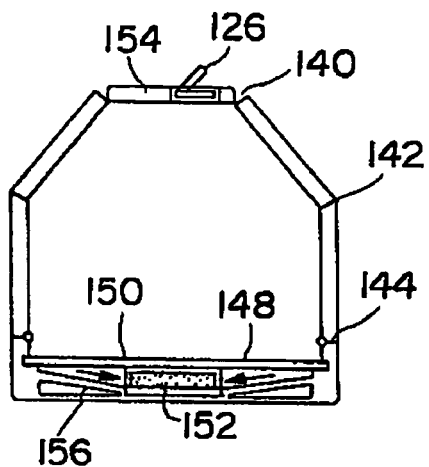
FIGS. 17 and 18 provide alternative front sectional view of the pet carrier/portable habitat of FIG. 15.

Also shown in FIG. 17 is the folding handle 126, and hinges 140, 142 and 144, which as previously noted, can assume either a mechanical or living-type membrane hinge configuration. For example; in a particular preferred design, hinges 140 and 142 are both of the living type or membrane hinge type variety, and hinge 144 can be a mechanical or piano type hinge design. Also better illustrated in FIG. 17 is the feature that the bottom section 112 contains a downwardly sloping surface 156 which again facilitates the flow of waste fluid toward the circular recessed area 152 which as illustrated in FIG. 17 to contain an absorbent pad. Finally, the removable tray 150 is shown in cross-section along with the general location of the ribbed supports 148.

Figure 18:
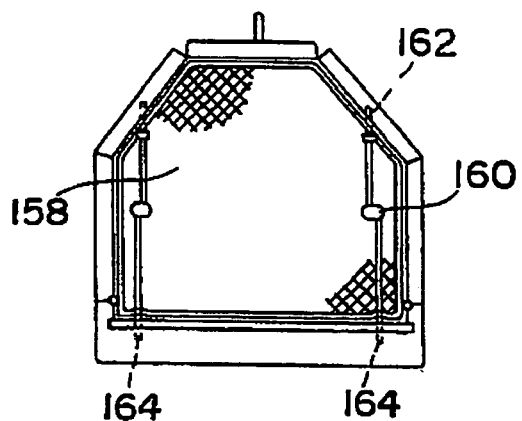
Figure 19:
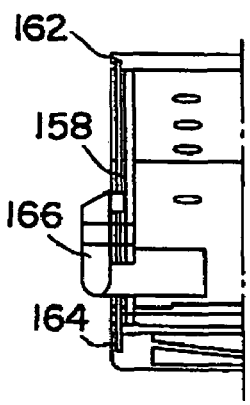
FIG. 19 provides a more detailed side sectional view of the front door section of the pet carrier/portable habitat.

Attention is next directed to FIG. 18, which is yet another front sectional view of the portable habitat, illustrating the use of a preferred metallic/chrome wire door 158. In addition, as further illustrated in FIG. 18, the door 158 contains a spring loaded pin release 160 along with pins at 162 and 164, thereby releasably engaging door 158 to the portable habitat structure at either a left or right location. With attention directed at FIG. 19, a more detailed sectional view is provided of the pins 162 and 164. It is therefore worth noting that by making the door 158 entirely releasable from the habitat, different doors can be employed which are more suitable for the particular animal at issue. For example, in the case of a bird, a small perch can be fitted to the door structure. In addition, as noted, the door 158 can be made to open and hinge either in a left or right direction.

Figure 20:
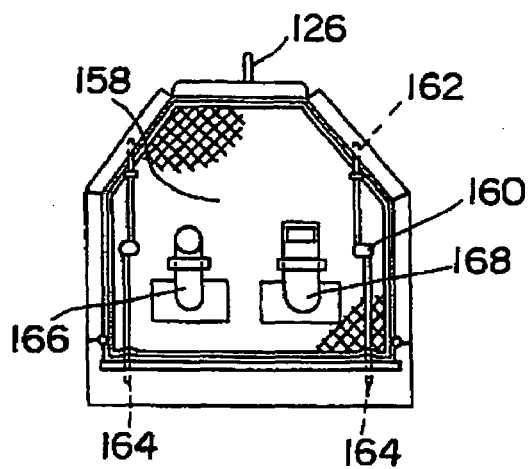
FIG. 20 is yet another front sectional view, illustrating the optional use of food and water dispensers.
Figure 21:
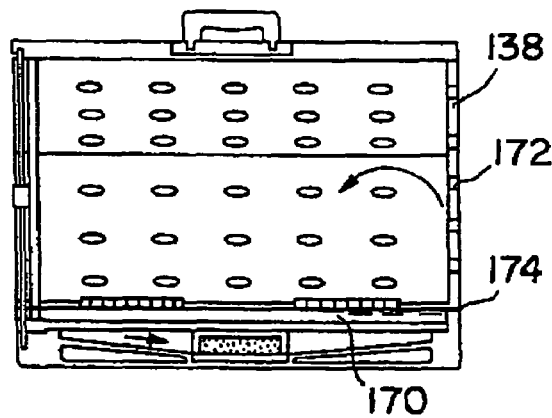
FIG. 21 is a side sectional view of the pet carrier/portable habitat of FIG. 15.

Attention is also directed to FIG. 20, which illustrates the optional use of food and water dispensers 166 and 168 in the door 158. In accordance with the present invention, as the animal can relieve itself without itself having to remain in contact with its liquid waste, the pet owner can more humanely provide the animal with liquid nourishment during prolonged travel periods. Finally, attention is also directed to FIG. 21, which provides a side sectional view of the portable habitat herein. As best shown in FIG. 13, a space is provided at 170 for accommodating the front door 158 when in collapsed configuration. In addition, illustrated end panel 138 which contains holes 172 is itself hinged at 174 for collapsing into the pet habitat.

Alternatively, it should again be appreciated that end panels 122 and 138, while preferably hingedly connected to the portable habitat for folding therein, may optionally be fully releasable for both removal and/or placement within the habitat during shipping and storage.

Figure 22:
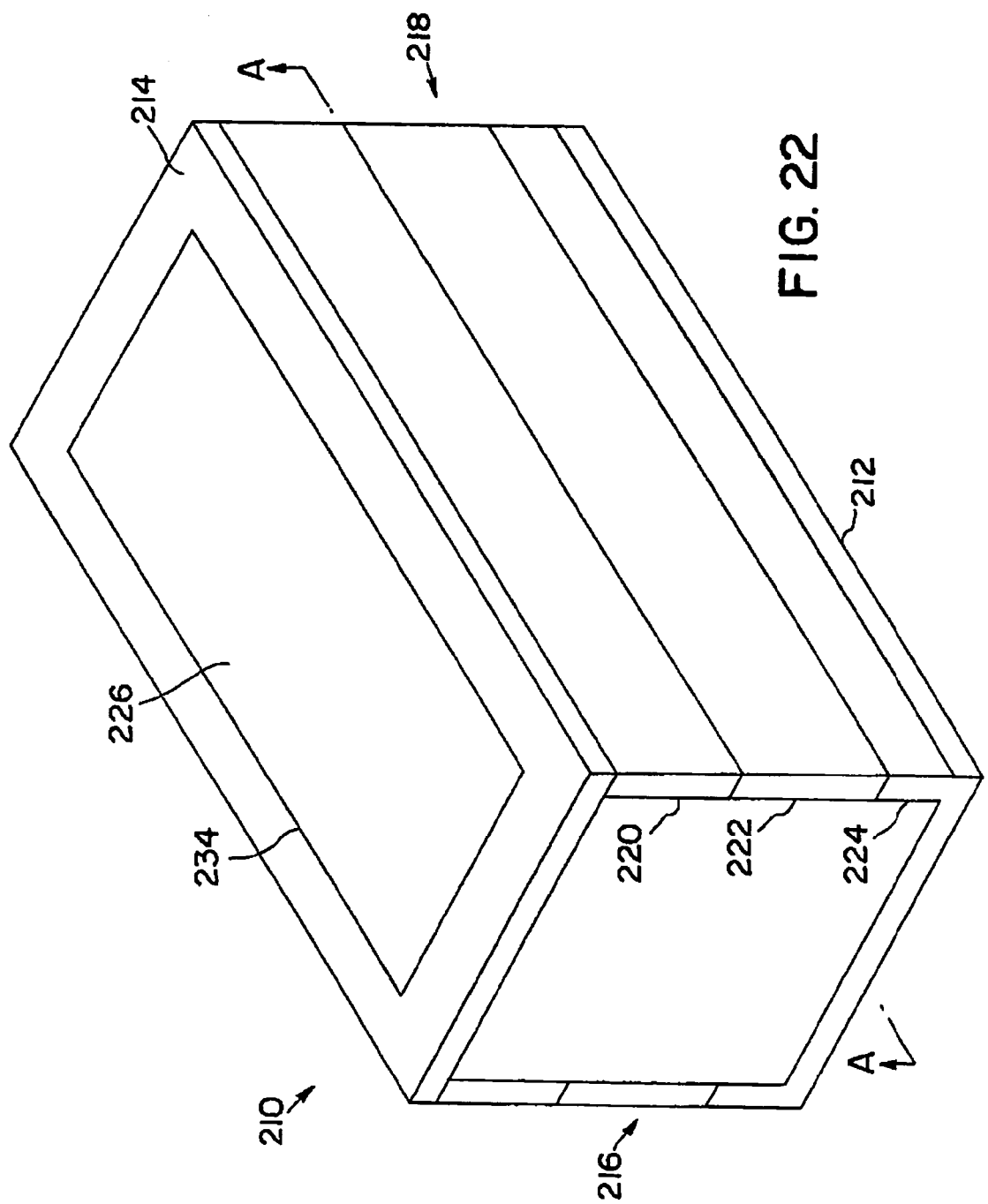
FIG. 22 is a perspective view of the invention herein as a collapsible cooler.

FIG. 22 illustrates the present invention, in preferred embodiment as a collapsible cooler 210 which contains a generally horizontally disposed bottom panel 212 and a vertically disposed side section 224. As illustrated, vertical disposed side section 224 is adjacent to bottom panel 212 and can be integral thereto. The cooler 210 also contains top panel 214, and side panels 216 and 218. Side panels 216 and 218 contain an upper 220, middle 222, and vertically disposed side section 224. The cooler 210 further contains a door or removable section 226 in the top panel 214. Door 226 is attached to top panel 214 by means of pivot 234, such that door 226 can pivot upward, and therein allow access to the interior of the cooler 210 for the purpose of placing items within cooler 210, or for removing items therefrom.

Figure 23:
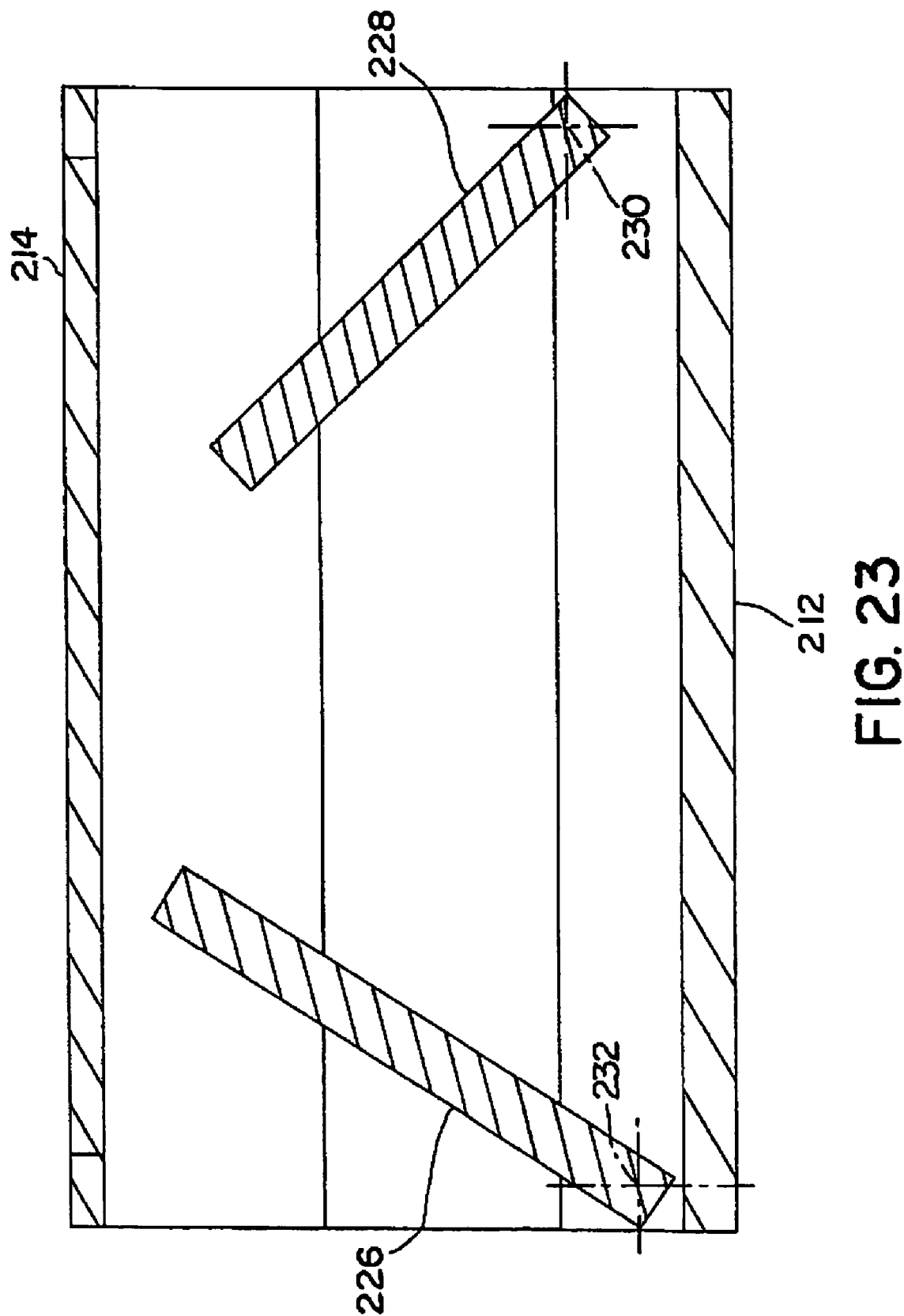
FIG. 23 is a side sectional view of the invention herein along lines A-A of FIG. 22.

As illustrated in FIG. 23, cooler 210 also contains two end panels 226 and 228. The two end panels 226 and 228 are preferably pivotally attached at 232 to vertical section 224, and not to horizontal bottom panel 212. In such manner, end panel 226 can readily pivot inwardly to rest upon bottom panel 212, and end panel 228 can pivot inwardly at 230 to rest upon end panel 226. It is preferred that pivots 230 and 232 are disposed on the outer edge surface of the end panels 226 and 228 to better facilitate the inward collapse of the end panels 226 and 228. With reference to FIG. 23, pivot locations 230 and 232 are shown without lower section 224. In other words, lower section 224, is not shown FIG. 23, so that the location of pivots 230 and 232 can be better illustrated.

The pivoting action at 230 and 232 is preferably provided for by a mating protrusion/receptacle on the edge of the front 226 or rear panel 228 and the adjacent region of the vertically disposed side section 224. The protrusion/receptacle may comprise a stud fitted into orifices of both the front/rear panels and the vertically disposed side section 224, a protrusion and a mating indentation, etc. It all cases, it is possible to form each half of the pivot integral with the respective panel.

Those skilled in the art, however, will also recognize that it may in addition be preferable to modify such pivotal/hinge attachment location to facilitate the resting of end panel 226 on top of end panel 228 when in collapsed state. Furthermore, those skilled in the art will appreciate that end panels 226 and 228 may not necessarily be pivotally attached at any location, and may be designed such that they are configured to be completely removed and separately stored. This would optionally be the case, e.g., in those situations wherein the invention herein is applied as a simple collapsible structure for the storage of consumer waste containers, although other applications are clearly possible. In such optional embodiment, end panels 226 and 228 would be assembled in such fashion to pressure fit within the collapsible structure herein. That is, the end panels 226 and 228 can be readily assembled such that they are releasably engaged to the collapsible structure by a simple press or interference fit.

Figure 24:
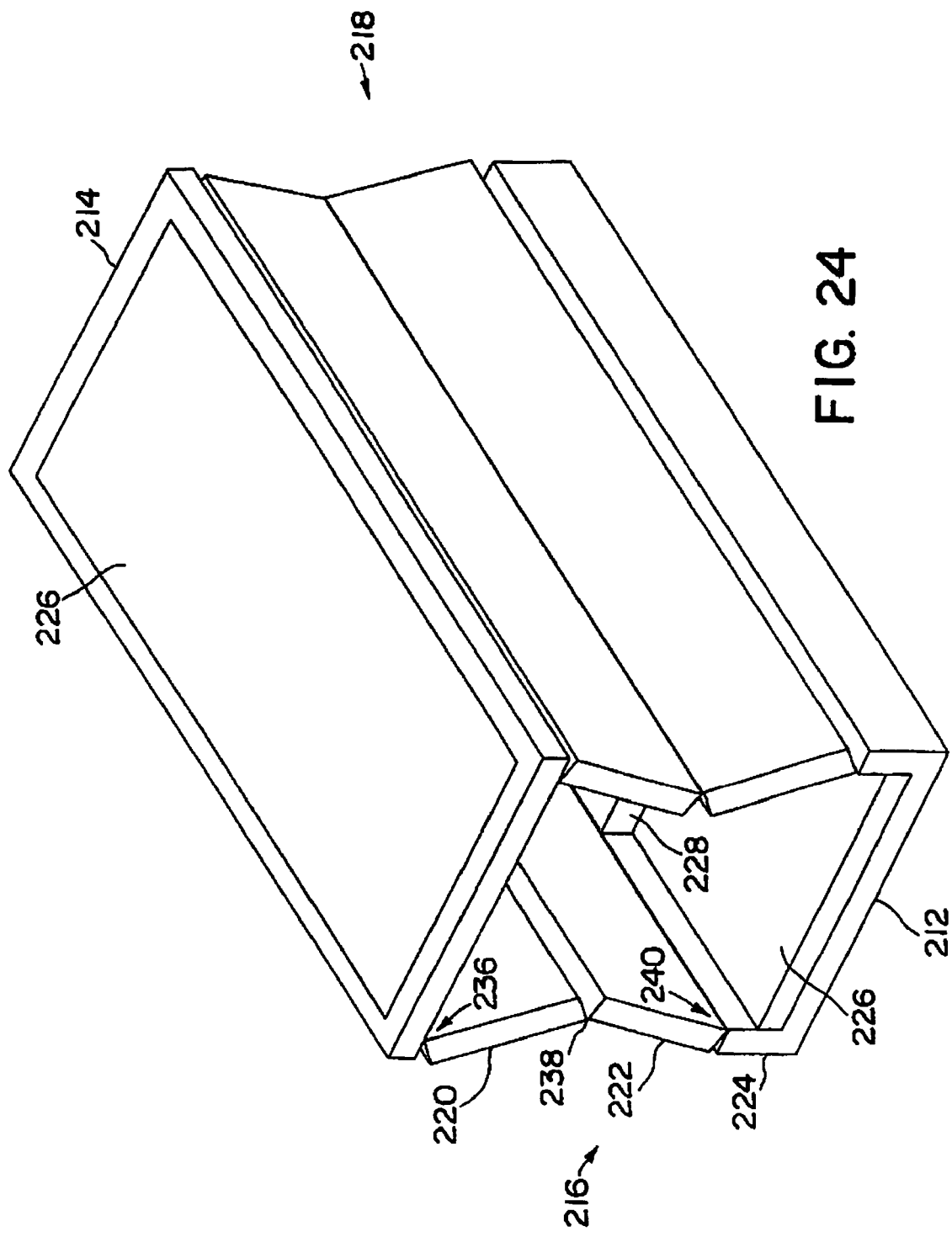
FIG. 24 is perspective view of the collapsible cooler in a partially collapsed configuration.

As illustrated in FIG. 24, once end panels 226 and 228 have pivoted inwardly, such that they can assume a horizontal posture atop of bottom panel 212, side panels 216 and 218 can pivot inward. The upper and middle sections 220 and 222 of side panels 216 and 218 are hingedly connected to one another about pivot 238. It is preferred that pivot 238 is disposed on the exterior surface of side panel 216 and 218 to better allow the upper and middle section 220 and 222 to fold inward so as to assume a horizontal posture wherein the exterior surfaces of the upper and middle sections 220 and 222 rest on one another. In addition, pivot 238 is preferably a living hinge, extending along the length of the cooler thereof. In such regard, those skilled in the art will appreciate that such living hinge would not only provide hinge type function, but would simultaneously provide a seal thereof, such that liquid contained within the cooler would not leak to the outside. Such living hinge is preferably made from polypropylene type material, and more broadly, polyolefin type polymer material, or flexible type polyolefin material, such as polyethylene/polypropylene copolymers, and/or polyethylene type copolymers containing comonomers of the alpha-olefin variety (e.g. 1-butene, 1-pentene, etc). Along such lines, those resins now commonly known as "single-site" or "metallocene' based polyolefines, which provide a polyethylene copolymer of controlled comonomer composition distribution, and narrow molecular weight distribution, are contemplated.

Upper section 220 is also further connected to the top panel 214 at pivot 236. Pivot 236 is preferably disposed on the interior surface of side wall 216 and 218 to facilitate the collapse of side panel 216 and 218 by way of top section 220 folding inward. Again, and in a manner similar to the above, pivot 236 is preferably of the integral hinge variety, and made from the indicated preferred materials.

Additionally, middle section 222 is connected to lower section 224 at pivot 240. Pivot 240 is preferably disposed on the interior surface of side panels 216 and 218 to better allow middle section 222 to pivot inward. Also, and in a manner consistent with the above, pivot 240 is preferably of the living hinge variety, and made from the preferred indicated materials.

With the hinges so placed, side panels 216 and 218 can collapse inward, wherein middle section 222 folds inward and downward towards bottom panel 212, and upper section 220 pivots inward and towards top panel 214, and therein drawing pivot 238 inward toward the center of cooler 210.

Figure 25:
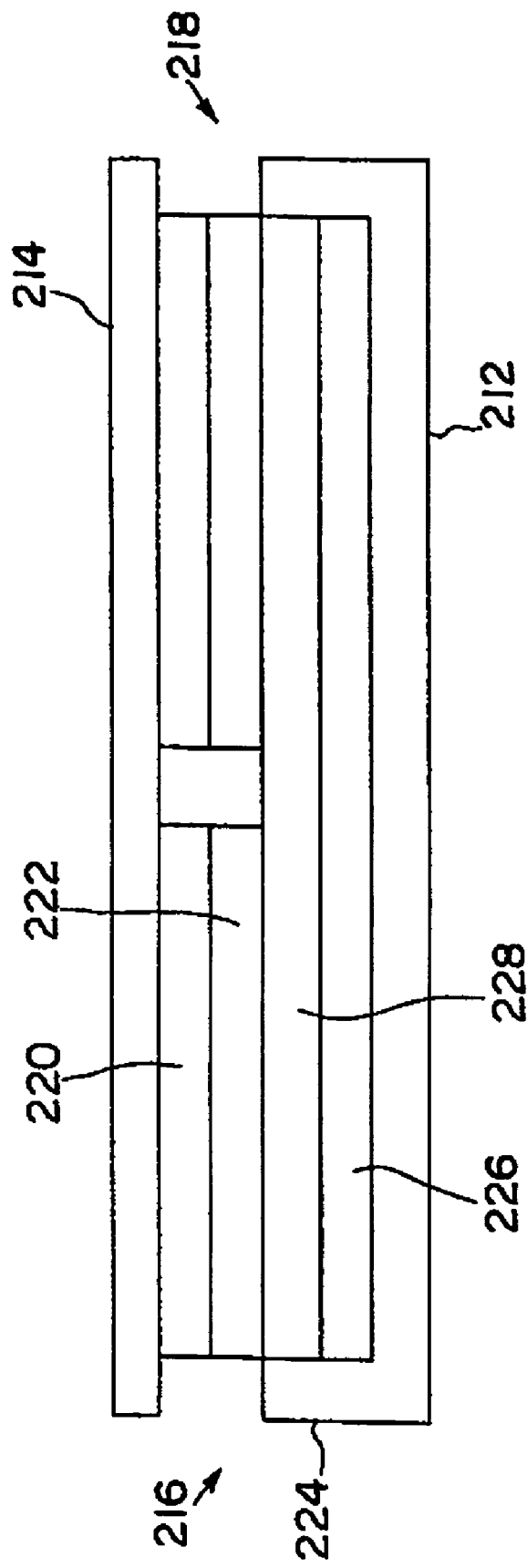
FIG. 25 is a perspective view of the collapsible cooler in a fully collapsed configuration.

FIG. 25 illustrates the present invention in a fully collapsed condition. This figure shows that the collapsing action described above of side panels 216 and 218 results in the vertical collapse of top panel 214, such that when the cooler 210 is fully collapsed, as illustrated in FIG. 25, top panel 214 comes to rest on folded upper section 220 which rests upon middle section 222. Furthermore, in that situation wherein end panels 226 and 228 are made to pivotally attach to the device, and are not completely removed, end panels 226 and 228 come to rest on bottom panel 212, wherein end panels 226 and 228 are further longitudinally contained by vertically disposed section 224.

In accordance with the intended end use of the present invention 210 as a cooler or ice chest, all panels should be preferably constructed of thermal insulating materials. Such materials include expanded type twin-wall construction polymer materials, preferably foam materials, optionally containing a film type (integral hinge) surface, as noted above, made via the process of blow molding. However, in the broad context of the present invention, single wall construction, of non-metallic material, such as injection molded plastic, is an option, and provides all of the advantages of collapsibility previously noted.

Suitable foam materials, as noted, would include, but not be limited to, foamed polystyrene, polyurea/urethane, polyurea, trimer foam, etc. In addition, in preferred embodiment, it can be appreciated that in order to increase the durability and structural integrity of the cooler the insulating material of the panels should, preferably, be coated with a material to effect such an increase in durability and strength. Accordingly, exterior, and preferably also interior surfaces of the panels, may be coated with a plastic sheeting material, including, but not limited to polyolefins, vinyl polymers, styrene based polymers, acrylonitrile-butadiene-styrene resins, vinyl polymer resins, engineering thermoplastics, and thermoset type resins or coatings.

Integrating a cooler's need for durability and strength, with the need for thermal insulation is preferably satisfied herein via the process of blow molding, wherein the exterior of the panel is made from a polymeric material, thereby providing strength and durability, and the air void between the skins of the panel would provide thermal insulation. Similarly, hollow panels made using a thermoforming process would also be suitable. Additionally, to further improve the thermal insulating properties of hollow panels, insulating material, for example foam, as herein noted, may be incorporated between the opposing skins which form the panel in, e.g., a downstream operation. The aforementioned techniques for forming panels of suitable durability, strength, and thermal insulating character is put forth only as a non-exhaustive list of possibilities. Those skilled in the art are aware that there are a large variety of techniques and materials which may be used to obtain panels and insulation of the above construction suitable for the manufacture of the present invention.

In that regard, it is also worth noting that when foam material is employed directly in the present invention, such as a structural foam, it has also been found preferable to include, on the outer layer of the foam, a protective film layer that prevents damage to the foam layer, and also provides a better or improved cosmetic appearance. The film layer can be made to assume an appearance which is cosmetically pleasing to the consumer. In that regard, a particularly preferred embodiment centers on the use of expanded polystyrene foam for the cooler 210, and an outer film layer, also of a polystyrene resin.

In addition to providing protection for a inner foam layer, and providing improved aesthetic appeal, an outer film material, whether a coating on a foam or a coating on the skins of a thermoformed or blow molded part, as previously discussed, can conveniently serve as an integral type hinge material. For example, pivots 230, 232, 234, 236, 238, and 240, as shown is FIGS. 22-24 can all comprise a mechanical standard type hinge construction, to effectuate the foldable/collapsible mechanism herein described. In such regard, e.g., pivot 236, 238 and/or 240 may preferably comprise one or a plurality of mechanical type hinges, along the length of the cooler 210.

Alternatively, and again as noted, said pivots can also run substantially along the length of the structure, which therefore provides a living-hinge characteristic to the present invention, Again, the living hinge can be either a non-integral feature, or, alternatively, can be integral to said structural components as illustrated in the drawings. When living hinges of the described nature are used the additional benefit of having a waterproof seam is readily provided.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A collapsible/foldable structure comprising:
   a top roof and a bottom platform defining a top and bottom of said structure, including a vertically disposed lower side section on said bottom platform;
   front and rear collapsible walls each movably positioned relative to said vertically disposed side section and which are configured to collapse inwardly into said collapsible/foldable structure so that said front and rear collapsible walls may rest upon one another and one of said front and rear collapsible walls may rest on said bottom platform;
   said front wall having an opening for egress and ingress of an animal;
   a pair of sidewalls each pivotally attached to said roof to facilitate inward collapse of said sidewalls when said sidewalls are pivoted toward said bottom platform, said sidewalls further containing upper and middle sections, wherein said upper and middle sections are pivotally attached to one another so that said upper and middle sidewall sections can be pivoted inwardly towards said bottom platform;
   and wherein said top roof further comprises a roof section pivotally attached to the upper sidewall sections, so that said roof section can collapse downwardly along said pivotable attachment toward said bottom platform;

said sidewalls having an outer and an inner surface thereof, and the middle wall section being pivotally attached to the vertically disposed lower side section along an inner edge of the middle wall section to permit folding of said middle sidewall inwardly toward said base, the upper wall section being pivotally attached to said middle wall section at the outer edge thereof to permit said upper wall section to collapse into contact with the outer surface of said lower wall section, and said roof section being pivotally connected to said two upper sidewall sections along the inner edges thereof to permit said top to be collapsed into contact with the inner surface of said upper wall sections.

2. The structure of claim 1 wherein said top roof, bottom platform and vertically disposed side section, pair of sidewalls and said front and rear walls are made from a thermally insulating polymeric material, polymeric foam material, expanded polystyrene foam, polyurethane foam, or structural foam material.

3. The structure of claim 1 wherein said middle and lower sections that are pivotally attached to one another are pivotally attached to one another substantially along a length of said sidewalls.

4. The structure of claim 1 wherein said sidewalls pivotally attached to said roof, are pivotally attached substantially along a length of said sidewalls.

5. The structure of claim 1 wherein said upper and middle sections pivotally attached to one another are pivotally attached substantially along a length of said sidewalls.

* * * * *